US008331035B2

(12) United States Patent
Kon

(10) Patent No.: US 8,331,035 B2
(45) Date of Patent: Dec. 11, 2012

(54) IMAGE PICKUP APPARATUS

(75) Inventor: Toyoki Kon, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/066,738

(22) Filed: Apr. 21, 2011

(65) Prior Publication Data

US 2011/0267708 A1 Nov. 3, 2011

(30) Foreign Application Priority Data

Apr. 28, 2010 (JP) ................................ 2010-103883

(51) Int. Cl.
*G02B 15/14* (2006.01)

(52) U.S. Cl. ....................................... 359/686; 359/676

(58) Field of Classification Search .................. 359/676, 359/686, 773

See application file for complete search history.

(56) References Cited

U.S. PATENT DOCUMENTS 7,920,332 B2 * 4/2011 Ohtake ........................ 359/676

FOREIGN PATENT DOCUMENTS

| | | |
|---|---|---|
| JP | S60-055314 | 3/1985 |
| JP | S60-142319 | 7/1985 |
| JP | H01-223409 | 9/1989 |
| JP | H04-053916 | 2/1992 |

* cited by examiner

*Primary Examiner* — Alicia M Harrington
(74) *Attorney, Agent, or Firm* — Kenyon & Kenyon LLP

(57) ABSTRACT

An image pickup apparatus includes in order from an object side a first lens group having a positive refractive power, a second lens group having a negative refractive power, a third lens group having a positive refractive power, and a fourth lens group having a negative refractive power. The fourth lens group includes an image forming optical system which comprises two lens components namely, a positive meniscus lens having a convex surface directed toward an image side, and a biconcave negative lens in order from the object side, or, one lens component in which, the positive meniscus lens having the convex surface directed toward the image side, and the biconcave negative lens are cemented, and the fourth lens group satisfies a predetermined conditional expression.

7 Claims, 25 Drawing Sheets

435.84
486.13
656.27
587.56

435.84
486.13
656.27
587.56

435.84
486.13
656.27
587.56

435.84
486.13
656.27
587.56

435.84
486.13
656.27
587.56

435.84
486.13
656.27
587.56

435.84
486.13
656.27
587.56

435.84
486.13
656.27
587.56

435.84
486.13
656.27
587.56

435.84
486.13
656.27
587.56

435.84
486.13
656.27
587.56

435.84
486.13
656.27
587.56

IMAGE PICKUP APPARATUS

CROSS-REFERENCE TO RELATED APPLICATION

The present application is based upon and claims the benefit of priority from the prior Japanese Patent Application No. 2010-103883 filed on Apr. 28, 2010; the entire contents of which are incorporated herein by reference.

BACKGROUND OF THE INVENTION

1. Field of the Invention

The present invention relates to an image pickup apparatus.

2. Description of the Related Art

In recent years, the popularity of an interchangeable-lens camera such as a single-lens reflex camera in which, an electronic image pickup apparatus such as a CCD (charge coupled device) and a CMOS (complementary metal oxide semiconductor) is used, has been increasing. In an interchangeable lens which is used in the interchangeable-lens camera, making a focusing lens group light-weight and simple and enabling rear focus by the focusing lens group have been sought. This is because, by making the focusing lens group light-weight and enabling rear focus for reducing drawing out of the interchangeable lens, it is possible to reduce a sound at the time of focusing. Accordingly, it is possible to reduce a sound of focusing at the time of still photography, and a sound of focusing which is generated by a frequent focusing movement at the time of video photography, in a case such as of a video photography by the interchangeable-lens camera of recent years in which, a highly defined video-photography function surpassing the conventional digital video camera has been installed.

However, when the focusing lens group is merely made light-weight and simple, it is not possible to prevent deterioration of various aberrations caused due to focusing. For instance, when focusing is carried out by one lens, suppressing fluctuation of aberrations, mainly a chromatic aberration, becomes difficult. Moreover, improving Petzval's sum also becomes difficult.

As a telescopic image forming optical system, image forming optical systems of a so-called double telephoto type, which include four lens groups namely, a positive lens group, a negative lens group, a positive lens group, and a negative lens group as disclosed in Japanese Patent Application Laid-open Publication Nos. Sho 60-142319, Sho 60-55314, Hei 1-223409, and Hei 4-53916, have been proposed. Moreover, in Japanese Patent Application Laid-open Publication No. Hei 4-53916, using a third lens group having a three-lens structure as a focusing lens group has been proposed.

SUMMARY OF THE INVENTION

An image pickup apparatus according to the present invention, includes in order from an object side a first lens group having a positive refractive power;

a second lens group having a negative refractive power;

a third lens group having a positive refractive power; and a fourth lens group having a negative refractive power, and the fourth lens group includes an image forming optical system which includes two lens components namely, a positive meniscus lens having a convex surface directed toward an image side, and a biconcave negative lens, in order from the object side, or, one lens component in which, the positive meniscus lens having the convex surface directed toward the image side, and the biconcave negative lens are cemented, and the fourth lens group satisfies the following conditional expressions (1) and (2).

$$N_{d4} \leqq -0.015 \times \nu_{d4} + 2.04 \quad (1)$$

$$-2.5 \leqq f_{G4}/L \leqq -1.5 \quad (2)$$

where, $N_{d4}$ denotes a refractive index of a glass material of the positive meniscus lens in the fourth lens group of the image forming optical system, $\nu_{d4}$ denotes Abbe's number $(n_{d1}-1)/(n_{F1}-n_{C1})$ for a d-line of the glass material of the positive meniscus lens in the fourth lens group of the image forming optical system, $f_{G4}$ denotes a focal length of the fourth lens group in the image forming optical system, L denotes a length of a diagonal of an image pickup element, and $n_{d1}$, $n_{c1}$, and $n_{F1}$ denote refractive indices of the positive meniscus lens for the d-line, a C-line, and an F-line respectively.

BRIEF DESCRIPTION OF THE DRAWINGS

FIG. 1A shows a state at a wide angle end, FIG. 1B shows an intermediate state, and FIG. 1C shows a state at a telephoto end;

FIG. 2A shows a state at the wide angle end, FIG. 2B shows an intermediate state, and FIG. 2C shows a state at the telephoto end;

FIG. 3A shows a state at the wide angle end, FIG. 3B shows an intermediate state, and FIG. 3C shows a state at the telephoto end;

FIG. 4A shows a state at a wide angle end, FIG. 4B shows an intermediate state, and FIG. 4C shows a state at a telephoto end;

FIG. 5A shows a state at the wide angle end, FIG. 5B shows an intermediate state, and FIG. 5C shows a state at the telephoto end;

FIG. 6A shows a state at the wide angle end, FIG. 6B shows an intermediate state, and FIG. 6C shows a state at the telephoto end;

FIG. 7A shows a state at a wide angle end, FIG. 7B shows an intermediate state, and FIG. 7C shows a state at a telephoto end;

FIG. 8A shows a state at the wide angle end, FIG. 8B shows an intermediate state, and FIG. 8C shows a state at the telephoto end;

FIG. 9A shows a state at the wide angle end, FIG. 9B shows an intermediate state, and FIG. 9C shows a state at the telephoto end;

FIG. 10A shows a state at a wide angle end, FIG. 10B shows an intermediate state, and FIG. 10C shows a state at a telephoto end;

FIG. 11A shows a state at the wide angle end, FIG. 11B shows an intermediate state, and FIG. 11C shows a state at the telephoto end;

FIG. 12A shows a state at the wide angle end, FIG. 12B shows an intermediate state, and FIG. 12C shows a state at the telephoto end;

FIG. 13A shows a state at a wide angle end, FIG. 13B shows an intermediate state, and FIG. 13C shows a state at a telephoto end;

FIG. 14A shows a state at the wide angle end, FIG. 14B shows an intermediate state, and FIG. 14C shows a state at the telephoto end;

FIG. 15A shows a state at the wide angle end, FIG. 15B shows an intermediate state, and FIG. 15C shows a state at the telephoto end;

FIG. 16A shows a state at a wide angle end, FIG. 16B shows an intermediate state, and FIG. 16C shows a state at a telephoto end;

FIG. 17A shows a state at the wide angle end, FIG. 17B shows an intermediate state, and FIG. 17C shows a state at the telephoto end;

FIG. 18A shows a state at the wide angle end, FIG. 18B shows an intermediate state, and FIG. 18C shows a state at the telephoto end;

FIG. 25A is a front view of a mobile telephone 400, FIG. 25B is a side view of the mobile telephone 400, and FIG. 25C is a cross-sectional view of a photographic optical system 405.

DETAILED DESCRIPTION OF THE INVENTION

Figure 1A:
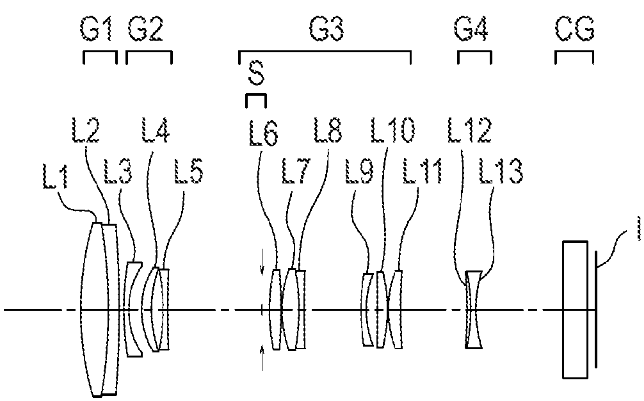
FIG. 1A, FIG. 1B, and FIG. 1C are cross-sectional views along an optical axis showing an optical arrangement at the time of infinite object point focusing of an image forming optical system according to a first embodiment of the present invention, where.

Prior to the description of embodiments, an action and an effect of an image forming optical system in an image pickup apparatus of the embodiments will be described below.

An image pickup apparatus according to the present invention includes in order from an object side a first lens group having a positive refractive power, a second lens group having negative refractive power, a third lens group having a positive refractive power, and a fourth lens group having a negative refractive power, and the fourth lens group includes an image forming optical system which includes two lens components namely, a positive meniscus lens having a convex surface directed toward an image side, and a biconcave negative lens in order from the object side, or, one lens component in which, the positive meniscus lens having the convex surface directed toward the image side, and the biconcave negative lens are cemented, and the fourth lens group satisfies the following conditional expressions (1) and (2).

$$N_{d4} \leqq -0.015 \times \nu_{d4} + 2.04 \quad (1)$$

$$-2.5 \leqq f_{G4}/L \leqq -1.5 \quad (2)$$

where, $N_{d4}$ denotes a refractive index of a glass material of the positive meniscus lens in the fourth lens group of the image forming optical system, $\nu_{d4}$ denotes Abbe's number $(n_{d1}-1)/(n_{F1}-n_{C1})$ for a d-line of the glass material of the positive meniscus lens in the fourth lens group of the image forming optical system, $f_{G4}$ denotes a focal length of the fourth lens group in the image forming optical system, L denotes a length of a diagonal of an image pickup element, and $n_{d1}$, $n_{C1}$, and $n_{F1}$ denote refractive indices of the positive meniscus lens for the d-line, a C-line, and an F-line respectively.

Conditional expression (1) indicates a range for selecting a glass material for the positive meniscus lens in the fourth lens group of the image forming optical system. By selecting a glass material which satisfies conditional expression (1), it is possible to carry out effectively a correction of a chromatic aberration from infinity to a close-point state and an improvement of Petzval's sum while facilitating a reduction in weight by making the fourth lens group to be of two lens components, or of one lens component in which the positive meniscus lens having the convex surface directed toward the image side and the biconcave negative lens are cemented. When an upper limit value of conditional expression (1) is surpassed, the correction of the chromatic aberration (particularly, fluctuation due to focusing) and the correction of Petzval's sum cannot be carried out sufficiently.

In this case, the glass material means a lens material such as glass, plastic, and resin. Moreover, a lens which has been selected appropriately from such glass materials is to be used for the cemented lens.

Moreover, it is desirable that the cemented lens is a compound lens. It is possible to realize a compound lens by hardening upon adhering closely a resin as a second lens with a surface of a first lens. By letting the cemented lens to be a compound lens, it is possible to improve a manufacturing accuracy. As a method for manufacturing a compound lens, molding is available. In molding, there is a method in which, a material of the second lens (such as an energy curable transparent resin) is brought in contact with the first lens, and the second lens material is adhered closely to the first lens material directly. This method is extremely effective for thinning a lens component.

Moreover, in a case of letting the cemented lens to be a compound lens, a glass, as the first lens, may be adhered closely to a surface of the second lens, and hardened. Glass, as compared to a resin, is advantageous from a point of resistance such as a light resistance and a chemical resistance. In this case, as properties of the second lens material, it is necessary that, a melting point and a transition point of the second lens material are lower than a melting point and a transition point of the material of the first lens. As a method for manufacturing a compound lens, molding is available. In molding, there is a method in which, the second lens material is brought in contact with the first lens, and the second lens material is adhered closely to the first lens material directly. This method is extremely effective for thinning a lens component. A surface treatment such as coating may be carried out in advance on the first lens.

As an example of the energy curable resin, an ultraviolet-curing resin is available. In both the cases namely, a case in which the first lens is made of a resin and a case in which the first lens is made of glass, a surface treatment such as coating may be carried out in advance on a side of a lens which becomes a base material. Moreover, when the second lens is thin, the first lens may be adhered closely to the second lens. Moreover, the first lens may be made of an inorganic material such as glass. However, in a case of a compound lens, since the lens which is to be cemented is made of resin, taking into consideration stability of optical performance with respect to a change in the environment, it is preferable that the second lens is similarly of a material having resin as a basic material.

The energy curable transparent resin can be treated not only as a compound lens but also as a single lens. A specific gravity of the energy curable transparent resin being small, it is possible to make lighter than glass by using a single lens. By forming a focusing group of two lens components namely the energy curable transparent resin and glass or plastic, it is possible to reduce weight similarly as of the compound lens.

For making the focusing lens group light-weight, it is preferable to use a glass material of the fourth lens group of the image forming optical system, having a low specific gravity. Examples of a glass material having a small low specific gravity are S-BSL 7, S-FSL 5, S-NSL 3, and S-NSL 36 manufactured by Ohara Inc., and ZEONEX 480 and ZEONEXE 48R manufactured by Zeon Corporation.

Conditional expression (2) is an expression which indicates a range of a ratio of a focal length of the fourth lens group for an image pickup element. By satisfying conditional expression (2), it is possible to make a compact interchangeable lens while reducing an aberration.

When an upper limit value −1.5 of conditional expression (2) is surpassed, an aberration which occurs at the fourth lens group increases, and it is not possible to suppress effectively an aberration fluctuation (particularly a coma aberration) in focusing from infinity to a close point.

When a lower limit value −2.5 of conditional expression (2) is surpassed, an amount of a focusing movement from infinity to a close point becomes large. This leads to an increase in a complexity of a structure of a lens barrel, and it becomes difficult to make compact the interchangeable lens as a whole.

It is more preferable that the fourth lens group satisfies the following conditional expression (2') instead of conditional expression (2).

$$-2.0 \leqq f_{G4}/L \leqq -1.75 \quad (2')$$

Moreover, in the image forming optical system of the image pickup apparatus according to the present invention, it is desirable that the image forming optical system satisfies the following conditional expression (3).

$$0.66 \leqq \theta_{gF4p} \leqq 0.75 \quad (3)$$

where, $\theta_{gF4p}$ denotes a partial dispersion ratio $(n_g-n_F)/(n_F-n_c)$ of the positive meniscus lens in the fourth lens group of the image forming optical system, where, $n_g$ denotes a refractive index for a g-line, of the positive meniscus lens, $n_F$ denotes a refractive index for the F-line, of the positive meniscus lens, and $n_C$ denotes a refractive index for the C-line, of the positive meniscus lens.

When an upper limit value 0.75 of conditional expression (3) is surpassed, correction of a longitudinal chromatic aberration and a chromatic aberration of magnification due to a secondary spectrum, or in other words, the longitudinal chromatic aberration and the chromatic aberration of magnification for the g-line when achromatized for the F-line and the C-line, cannot be carried out sufficiently. Therefore, in an image which has been picked up, it is difficult to secure sharpness.

When a lower limit value 0.66 of conditional expression (3) is surpassed, correction of the longitudinal chromatic aberration and the chromatic aberration of magnification due to the secondary spectrum, or in other words, the longitudinal chromatic aberration and the chromatic aberration of magnification for the g-line when achromatized for the F-line and the C-line, cannot be carried out sufficiently. Therefore in an image which has been picked up similarly, it is difficult to secure sharpness.

It is more preferable that the image forming optical system satisfies the following conditional expression (3') instead of conditional expression (3).

$$0.66 \leqq \theta_{gF4p} \leqq 0.72 \quad (3')$$

Furthermore, it is all the more preferable that the image forming optical system satisfies the following conditional expression (3") instead of conditional expression (3).

$$0.665 \leqq \theta_{gF4p} \leqq 0.7 \quad (3")$$

Moreover, in the image forming optical system of the image pickup apparatus according to the present invention, it is desirable that the image forming optical system satisfies the following conditional expression (4).

$$-7.0 \leqq (R_{b+}+R_{a+})/(R_{b+}-R_{a+}) \leqq -2.0 \quad (4)$$

where, $R_{a+}$ denotes a radius of curvature on the object side, of the positive meniscus lens in the fourth lens group of the image forming optical system, and $R_{b+}$ denotes a radius of curvature on the image side, of the positive meniscus lens in the fourth lens group of the image forming optical system.

When an upper limit value −2.0 of conditional expression (4) is surpassed, correction of astigmatism and chromatic aberration of magnification at infinity and a close point cannot be carried out effectively.

When a lower limit value −7.0 of conditional expression (4) is surpassed, correction of a spherical aberration, the astigmatism, and the chromatic aberration of magnification at infinity and a close point cannot be carried out effectively.

It is more preferable that the image forming optical system satisfies the following conditional expression (4') instead of conditional expression (4).

$$-5.0 \leqq (R_{b+}+R_{a+})/(R_{b+}-R_{a+}) \leqq -2.0 \quad (4')$$

Furthermore, it is all the more preferable that the image forming optical system satisfies the following conditional expression (4") instead of conditional expression (4).

$$-4.0 \leqq (R_{b+}+R_{a+})/(R_{b+}-R_{a+}) \leqq -2.1 \quad (4")$$

In addition to the abovementioned conditional expression (4), when the fourth lens group of the image forming optical system includes two lens components namely a positive meniscus lens and a negative lens, it is preferable that the image forming optical system satisfies the following conditional expression (5).

$$0 \leqq (R_{b-}+R_{a-})/(R_{b-}-R_{a-}) \leqq 1.2 \quad (5)$$

where, $R_{a-}$ denotes a radius of curvature on the object side, of the negative lens in the fourth lens group of the image forming optical system, and $R_{b-}$ denotes a radius of curvature on the image side, of the negative lens in the fourth lens group of the image forming optical system.

By satisfying conditional expression (5), it is possible to decrease a volume of the negative lens while suppressing a deterioration of astigmatism, thereby making it possible to decrease a weight of the lens.

In addition to the abovementioned conditional expression (4), when the fourth lens group of the image forming optical system includes one lens component in which, the positive meniscus lens and the negative lens are cemented, it is preferable that the image forming optical system satisfies the following conditional expression (5').

$$0.25 \leqq (R_{b-}+R_{a-})/(R_{b-}-R_{a-}) \leqq 0.15 \quad (5')$$

By satisfying conditional expression (5'), it is possible to decrease the volume of the negative lens while suppressing a degradation of astigmatism, thereby making it possible to decrease the weight of the lens.

Moreover, in the image forming optical system of the image pickup apparatus according to the present invention, it is desirable that the third lens group of the image forming optical system, in order from the object side, includes an aperture stop, a front group of a positive lens component, and a rear group of a positive lens component, and has a negative lens component nearest to the image side of the front group.

Moreover, in the image forming optical system of the image pickup apparatus according to the present invention, it is desirable that the third lens group of the image forming optical system, in order from the object side, includes an aperture stop, a front group of a positive lens component, and a rear group of a positive lens component, and has a negative lens nearest to the object side of the rear group.

By making an abovementioned arrangement, an arrangement inside the third lens group of the image forming optical system becomes a symmetrical system having a positive refractive power, a negative refractive power, and a positive refractive power. By such arrangement, it is possible to carry out effectively, correction of the spherical aberration, a curvature of field, and astigmatism at a state at infinity and a close point state.

It is preferable that the third lens group of the image forming optical system satisfies conditional expression (6).

$$0.25 \leqq d_{fb}/d_{G3} \leqq 0.5 \quad (6)$$

where, $d_{fb}$ denotes a distance between the front group and the rear group of the third lens group of the image forming optical system, and $d_{G3}$ denotes a distance from a plane nearest to the object side, of the third lens group of the image forming optical system up to a plane nearest to the image side, of the third lens group of the image forming optical system.

When an upper limit value 0.5 of conditional expression (6) is surpassed, correction of the spherical aberration, the curvature of field, and astigmatism at infinity and a close point state cannot be carried out effectively.

When a lower limit value 0.25 of conditional expression (6) is surpassed, similarly, correction of the spherical aberration, the curvature of field, and the astigmatism at infinity and a close point state cannot be carried out effectively.

Moreover, in the image forming optical system of the image pickup apparatus according to the present invention, it is desirable that the second lens group of the image forming optical system, in order from the object side, includes a negative lens component, a positive lens component, and a negative lens component.

By making the abovementioned arrangement, an arrangement in the second lens group is a symmetrical system having a negative lens component, a positive lens component, and a negative lens component. By such arrangement, correction of the spherical aberration, the curvature of field, the astigmatism, and the chromatic aberration at infinity and a close point state can be carried out effectively.

Moreover, in the image forming optical system of the image pickup apparatus according to the present invention, it is desirable that the first lens group of the image forming optical system, in order from the object side, includes two lens components namely a positive lens component and a negative lens component, or one lens component in which, the positive lens component and the negative lens component are cemented.

By making the abovementioned arrangement, correction of a longitudinal aberration and an oblique aberration from an intermediate state to a telephoto end with a substantial axial and off-axis marginal light ray height can be carried out effectively.

In the zoom lens described in Japanese Patent application Laid-open Publication No. Hei 4-53916, in a case of a video photography, for carrying out AF (auto focus) by searching a focused position all the time during capturing, it is necessary to move the focusing lens group all the time. Therefore, when the video photography is carried out with this arrangement, an electric power consumption of a focusing drive motor is high, and also a sound is high, which are problems, and it is not suitable as an interchangeable lens for carrying out video photography. Whereas, the image forming optical system of the image pickup apparatus according to the present invention is capable of suppressing the consumption of electric power during video photography and reducing sound.

EMBODIMENTS

Exemplary embodiments of the image forming optical system and an electronic image pickup apparatus according to the present invention will be described below in detail by referring to the accompanying diagrams. However, the present invention is not restricted to the embodiments described below.

Figure 1B:
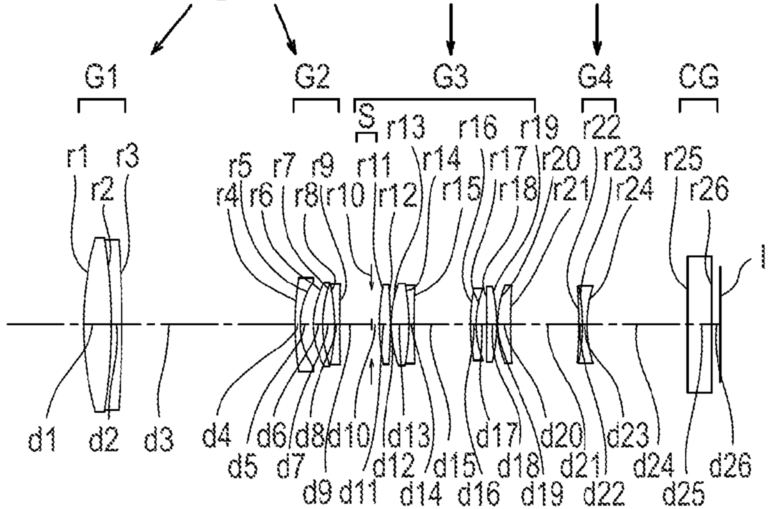
Figure 1C:
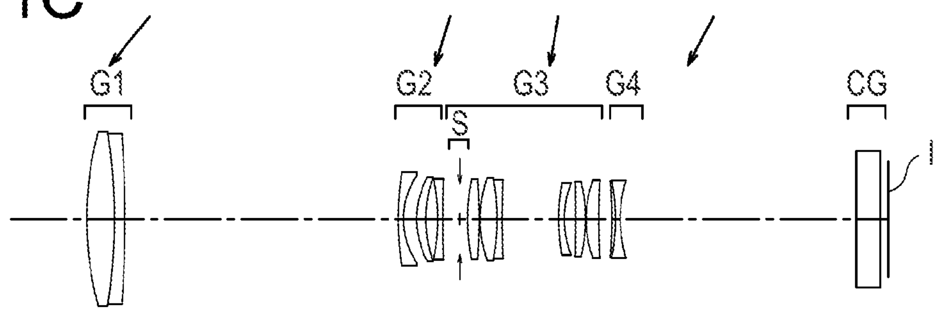

To start with, an image forming optical system of an image pickup apparatus according to a first embodiment of the present invention will be described below. FIG. 1A, FIG. 1B, and FIG. 1C are cross-sectional views along an optical axis showing an optical arrangement at the time of infinite object point focusing of the image forming optical system according to the first embodiment of the present invention, where, FIG. 1A shows a state at a wide angle end, FIG. 1B shows an intermediate focal length state, and FIG. 10 shows a state at a telephoto end.

Figure 2A:
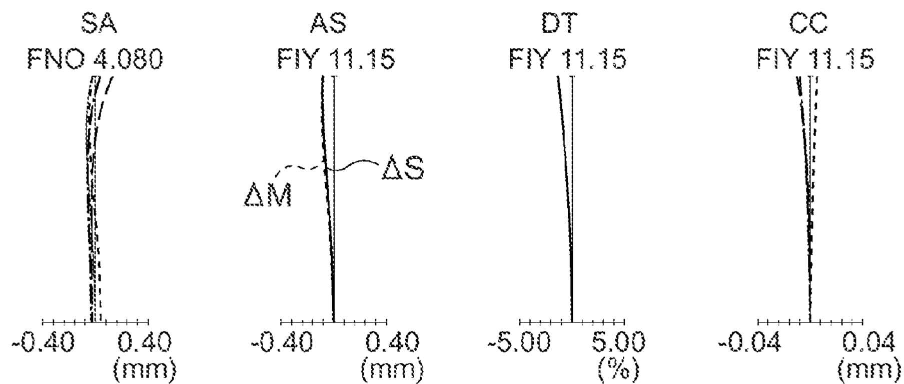
FIG. 2A, FIG. 2B, and FIG. 2C are diagrams showing a spherical aberration, an astigmatism, a distortion, and a chromatic aberration of magnification at the time of infinite object point focusing of the image forming optical system according to the first embodiment, where.
Figure 2B:
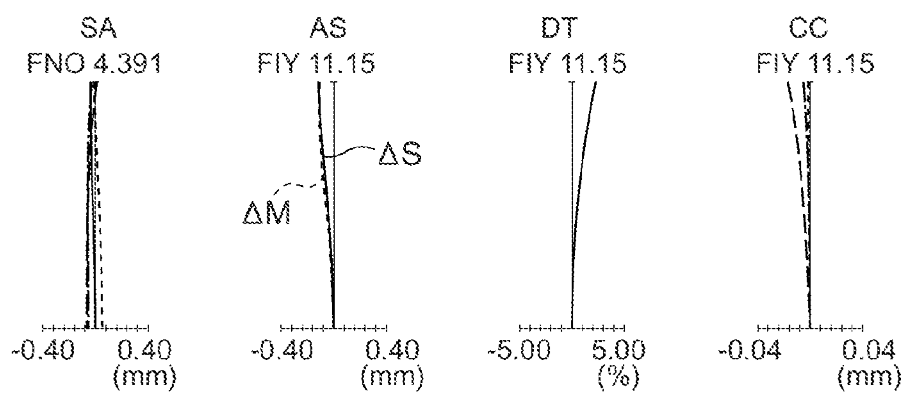
Figure 2C:
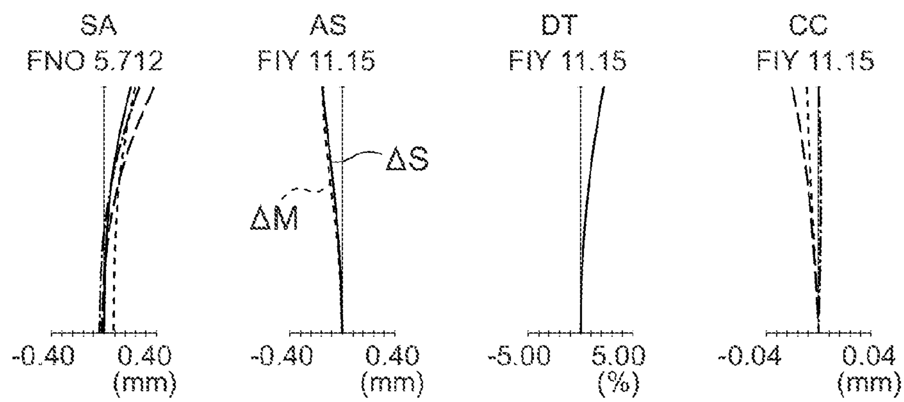

FIG. 2A, FIG. 2B, and FIG. 2C are diagrams showing a spherical aberration (SA), an astigmatism (AS), a distortion (DT), and a chromatic aberration of magnification (CC) at the time of infinite object point focusing of the image forming optical system according to the first embodiment, where, FIG. 2A shows a state at the wide angle end, FIG. 2B shows an intermediate focal length state, and FIG. 2C shows a state at the telephoto end. Moreover, FIY denotes an image height. Symbols in aberration diagrams are same for the embodiments which will be described later.

Figure 3A:
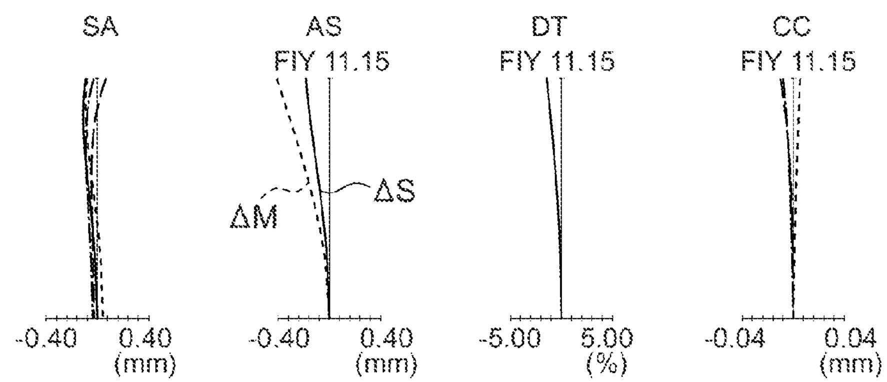
FIG. 3A, FIG. 3B, and FIG. 3C are diagrams showing the spherical aberration, the astigmatism, the distortion, and the chromatic aberration of magnification at the time of focusing at an object point which is 900 mm from the image plane according to the first embodiment, where
Figure 3B:
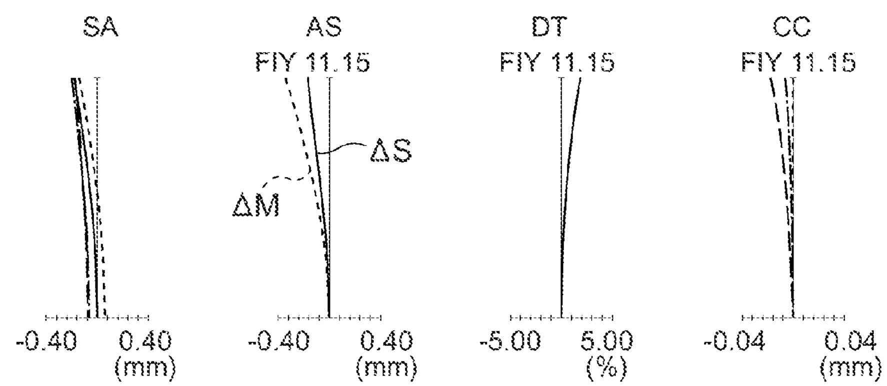
Figure 3C:
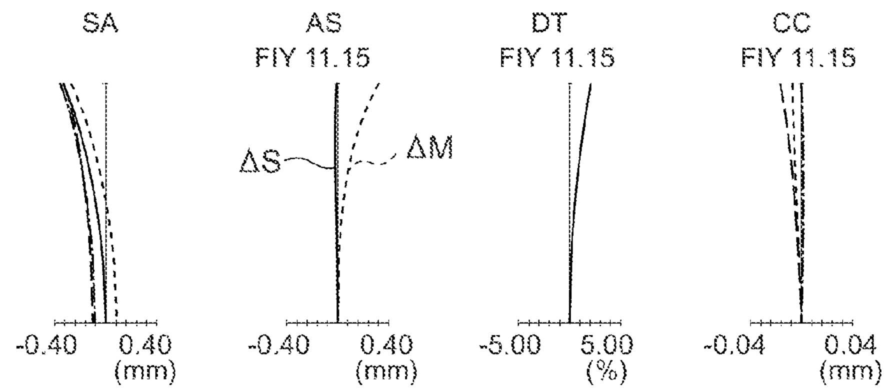

FIG. 3A, FIG. 3B, and FIG. 3C are diagrams showing the spherical aberration, the astigmatism, the distortion, and the chromatic aberration of magnification at the time of focusing at an object point which is 900 mm from the image plane according to the first embodiment, where, FIG. 3A shows a state at the wide angle end, FIG. 3B shows an intermediate state, and FIG. 3C shows a state at the telephoto end.

The image forming optical system according to the first embodiment, as shown in FIG. 1A, FIG. 1B, and FIG. 10, includes in order from an object side, a first lens group G1 having a positive refractive power, a second lens group G2 having a negative refractive power, a third lens group G3 having a positive refractive power, which includes an aperture stop S, and a fourth lens group G4 having a negative refractive power. In all the embodiments which will be described below, in the lens cross-sectional views, CG denotes a cover glass and I denotes an image pickup surface of an electronic image pickup element.

The first lens group G1 includes a cemented lens of a biconvex positive lens L1 and a negative meniscus lens L2 having a convex surface directed toward an image side, in order from the object side, and has a positive refractive power as a whole.

The second lens group G2, in order from the object side, includes a negative meniscus lens L3 having a convex surface directed toward the object side, a positive meniscus lens L4 having a convex surface directed toward the object side, and a biconcave negative lens L5, and has a negative refractive power as a whole.

The third lens group G3, in order from the object side, includes the aperture stop S, a biconvex positive lens L6, a cemented lens of a biconvex positive lens L7 and a biconcave negative lens L8, a negative meniscus lens L9 having a convex surface directed toward the object side, a positive meniscus lens L10 having a convex surface directed toward the image side, and a positive meniscus lens L11 having a convex surface directed toward the object side, and has a positive refractive power as a whole. Here, the biconvex positive lens L6, and the cemented lens of the biconvex positive lens L7 and the biconcave negative lens L8 form a front group, which has a positive refractive power. The negative meniscus lens L9 having the convex surface directed toward the object side, the positive meniscus lens L10 having the convex surface directed toward the image side, and the positive meniscus lens L11 having the convex surface directed toward the object side form a rear group, which has a positive refractive power.

The fourth lens group G4 includes a cemented lens of a positive meniscus lens L12 having a convex surface directed toward the image side and a biconcave negative lens L13, in order from the object side, and has a negative refractive power as a whole.

At the time of zooming from the wide angle end to the telephoto end, the first lens group G1 moves toward the object side while widening a distance from the second lens group G2. The second lens group G2 moves toward the image side while narrowing a distance from the third lens group G3, from the wide angle end up to the intermediate state, and moves toward the object side while narrowing the distance from the third lens group G3, from the intermediate state up to the telephoto state. The third lens group G3 moves toward the object side while narrowing a distance from the second lens group G2, from the wide angle end up to the intermediate state. The fourth lens group G4 moves toward the object side while widening a distance from the third lens group G3, from the wide angle end to the intermediate state, and moves toward the object side while narrowing the distance from the third lens group G3, from the intermediate state up to the telephoto end. Moreover, the fourth lens group G4, at the time of focusing from infinity to a close point, moves toward the image side while widening the distance from the third lens group G3.

Figure 4A:
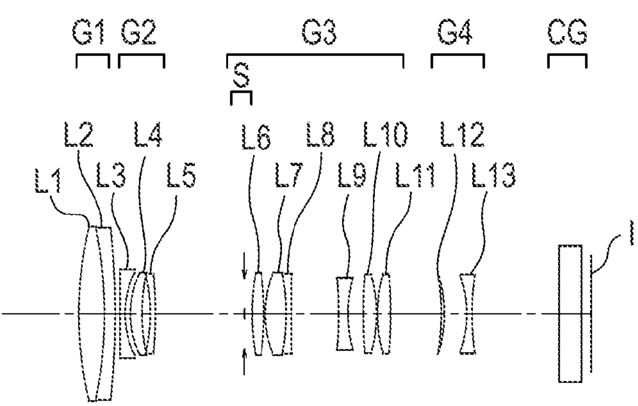
FIG. 4A, FIG. 4B, and FIG. 4C are cross-sectional views along an optical axis showing an optical arrangement at the time of infinite object point focusing of an image forming optical system according to a second embodiment of the present invention, where.
Figure 4B:
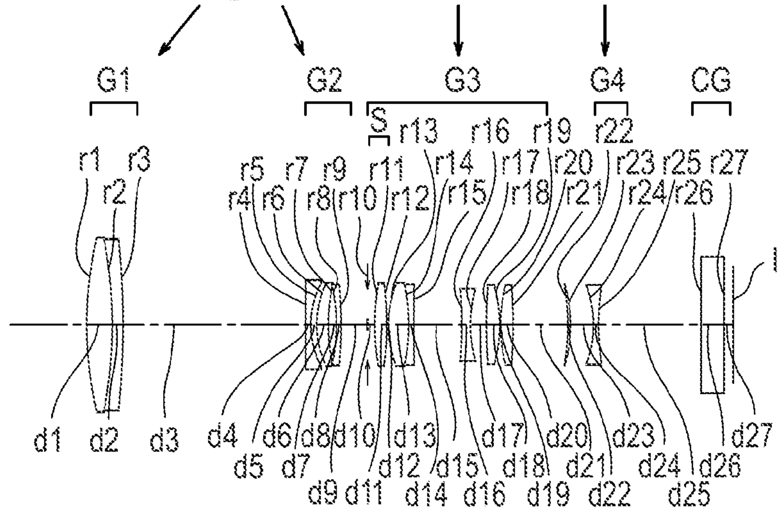
Figure 4C:
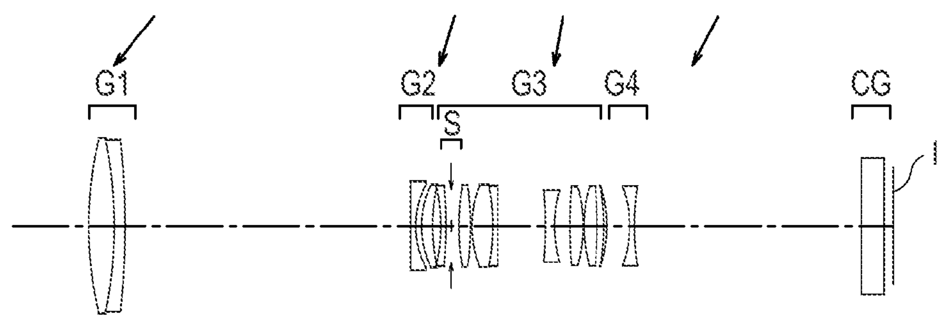

Next, an image forming optical system of an image pickup apparatus according to a second embodiment of the present invention will be described below. FIG. 4A, FIG. 4B, and FIG. 4C are cross-sectional views along an optical axis showing an optical arrangement at the time of infinite object point focusing of an image forming optical system according to the second embodiment of the present invention, where, FIG. 4A shows a state at a wide angle end, FIG. 4B shows an intermediate focal length state, and FIG. 4C shows a state at a telephoto end.

Figure 5A:
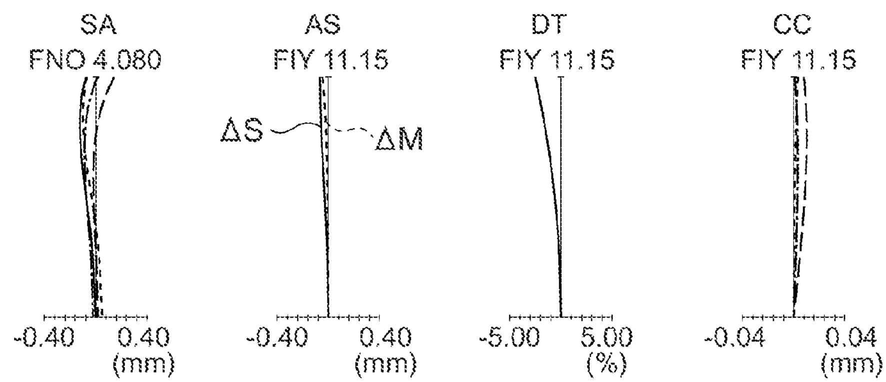
FIG. 5A, FIG. 5B, and FIG. 5C are diagrams showing a spherical aberration, an astigmatism, a distortion, and a chromatic aberration of magnification at the time of infinite object point focusing of the image forming optical system according to the second embodiment, where.
Figure 5B:
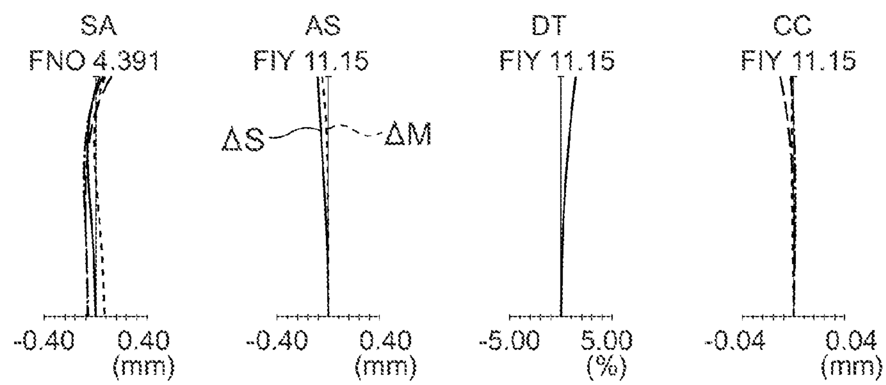
Figure 5C:
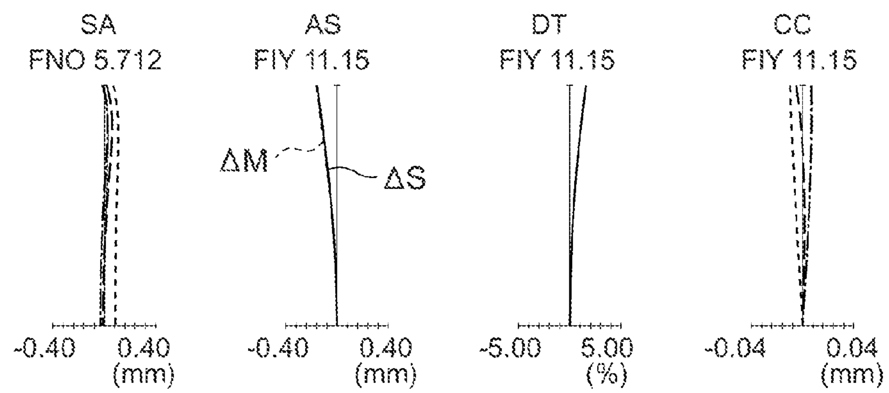

FIG. 5A, FIG. 5B, and FIG. 5C are diagrams showing a spherical aberration, an astigmatism, a distortion, and a chromatic aberration of magnification at the time of infinite object point focusing of the image forming optical system according to the second embodiment, where, FIG. 5A shows a state at the wide angle end, FIG. 5B shows an intermediate state, and FIG. 5C shows a state at the telephoto end.

Figure 6A:
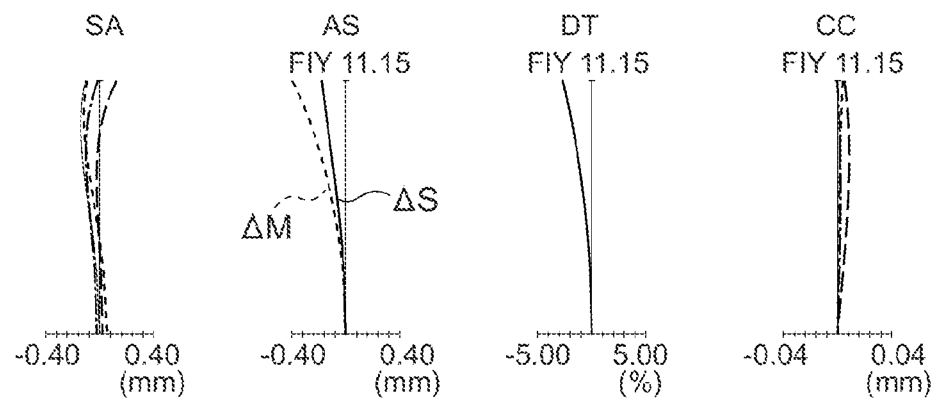
FIG. 6A, FIG. 6B, and FIG. 6C are diagrams showing the spherical aberration, the astigmatism, the distortion, and the chromatic aberration of magnification at the time of focusing at an object point which is 900 mm from the image plane according to the second embodiment, where.
Figure 6B:
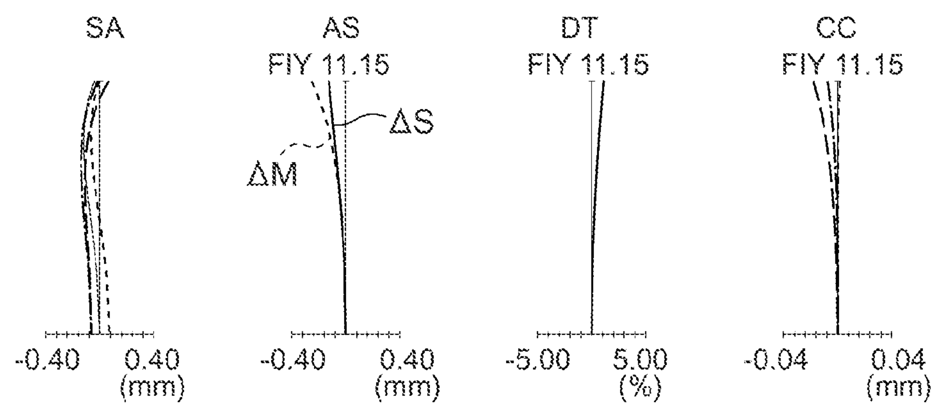
Figure 6C:
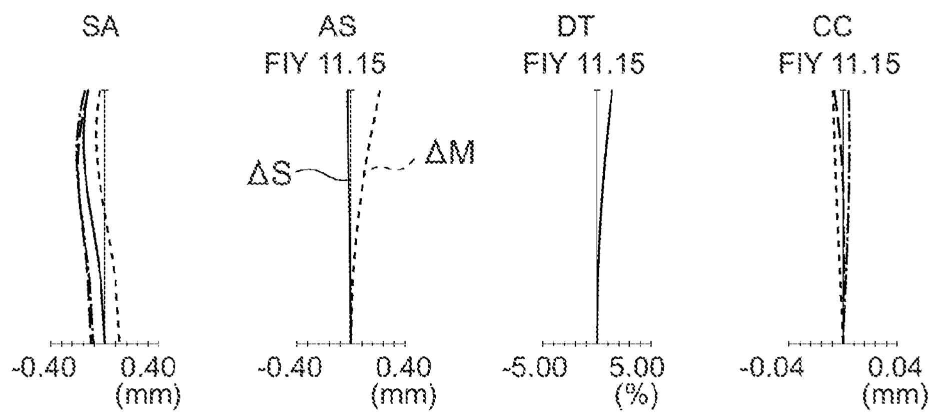

FIG. 6A, FIG. 6B, and FIG. 6C are diagrams showing the spherical aberration, the astigmatism, the distortion, and the chromatic aberration of magnification at the time of focusing at an object point which is 900 mm from the image plane according to the second embodiment, where, FIG. 6A shows a state at the wide angle end, FIG. 6B shows an intermediate state, and FIG. 6C shows a state at the telephoto end.

The image forming optical system according to the second embodiment, as shown in FIG. 4A, FIG. 4B, and FIG. 4C, includes in order from an object side, a first lens group G1 having a positive refractive power, a second lens group G2 having a negative refractive power, a third lens group G3 having a positive refractive power, which includes an aperture stop S, and a fourth lens group G4 having a negative refractive power.

The first lens group G1 includes a cemented lens of a biconvex positive lens L1 and a negative meniscus lens L2 having a convex surface directed toward an image side, in order from the object side, and has a positive refractive power as a whole.

The second lens group G2, in order from the object side, includes a negative meniscus lens L3 having a convex surface directed toward the object side, a positive meniscus lens L4 having a convex surface directed toward the object side, and a negative meniscus lens L5 having a convex surface directed toward the image side, and has a negative refractive power as a whole.

The third lens group G3, in order from the object side, includes the aperture stop S, the biconvex positive lens L6, a cemented lens of a biconvex positive lens L7 and a biconcave negative lens L8, a biconcave negative lens L9, a biconvex positive lens L10, and a biconvex positive lens L11, and has a positive refractive power as a whole. Here, the biconvex positive lens L6, and the cemented lens of the biconvex positive lens L7 and the biconcave negative lens L8 form a front group, which has a positive refractive power. The biconcave negative lens L9, the biconvex positive lens L10, and the biconvex positive lens L11 form a rear group, which has a positive refractive power.

The fourth lens group G4, in order from the object side, includes a positive meniscus lens L12 having a convex surface directed toward the image side and a biconcave negative lens L13, and has a negative refractive power as a whole.

At the time of zooming from the wide angle end to the telephoto end, the first lens group G1 moves toward the object side while widening a distance from the second lens group G2. The second lens group G2 moves toward the image side while narrowing a distance from the third lens group G3, from the wide angle end up to the intermediate state, and moves toward the object side while narrowing the distance from the third lens group G3, from the intermediate state up to the telephoto state. The third lens group G3 moves toward the object side while narrowing a distance from the second lens group G2, from the wide angle end up to the telephoto end. The fourth lens group G4 moves toward the object side while widening a distance from the third lens group G3, from the wide angle end up to the intermediate state, and moves toward the object side while narrowing the distance from the third lens group G3, from the intermediate state up to the telephoto end. Moreover, the fourth lens group G4, at the time of focusing form infinity to a close point, moves toward the image side while widening the distance from the third lens group G3.

Figure 7A:
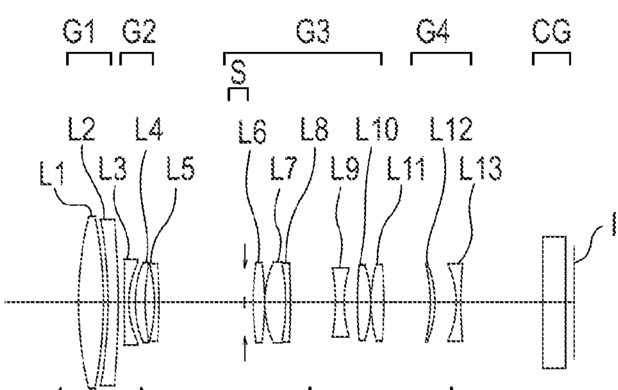
FIG. 7A, FIG. 7B, and FIG. 7C are cross-sectional views along an optical axis showing an optical arrangement at the time of infinite object point focusing of an image forming optical system according to a third embodiment of the present invention, where.
Figure 7B:
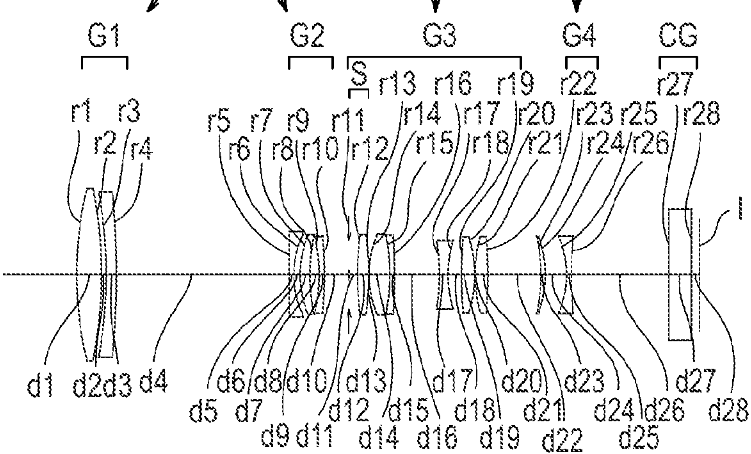
Figure 7C:
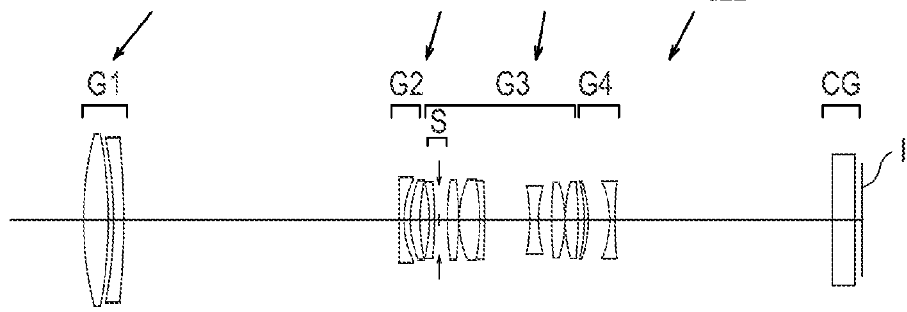

Next, an image forming optical system of an image pickup apparatus according to a third embodiment of the present invention will be described below. FIG. 7A, FIG. 7B, and FIG. 7C are cross-sectional views along an optical axis showing an optical arrangement at the time of infinite object point focusing of the image forming optical system according to the third embodiment of the present invention, where, FIG. 7A shows a state at a wide angle end, FIG. 7B shows an intermediate focal length state, and FIG. 7C shows a state at a telephoto end.

Figure 8A:
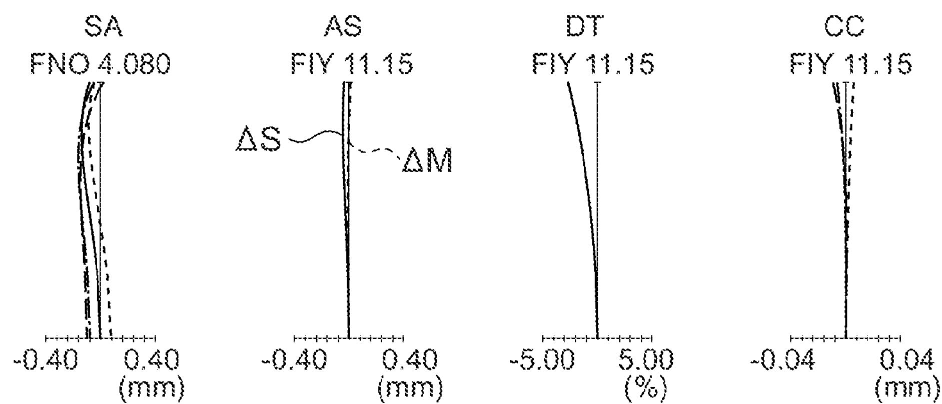
FIG. 8A, FIG. 8B, and FIG. 8C are diagrams showing a spherical aberration, an astigmatism, a distortion, and a chromatic aberration of magnification at the time of infinite object point focusing of the image forming optical system according to the third embodiment, where.
Figure 8B:
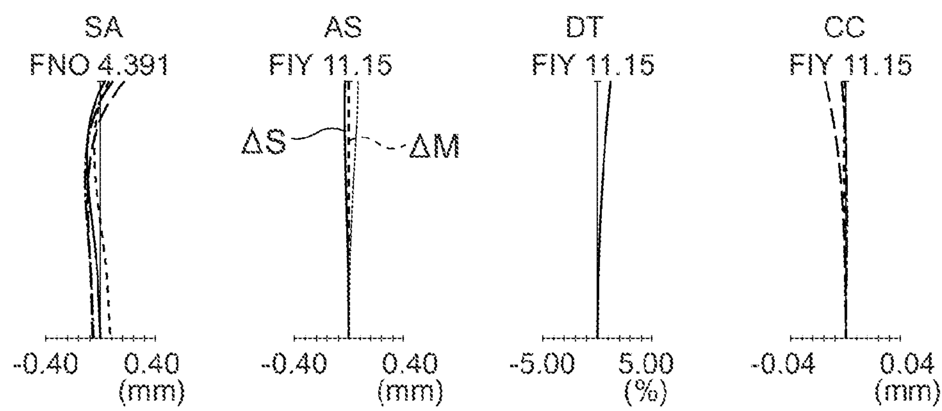
Figure 8C:
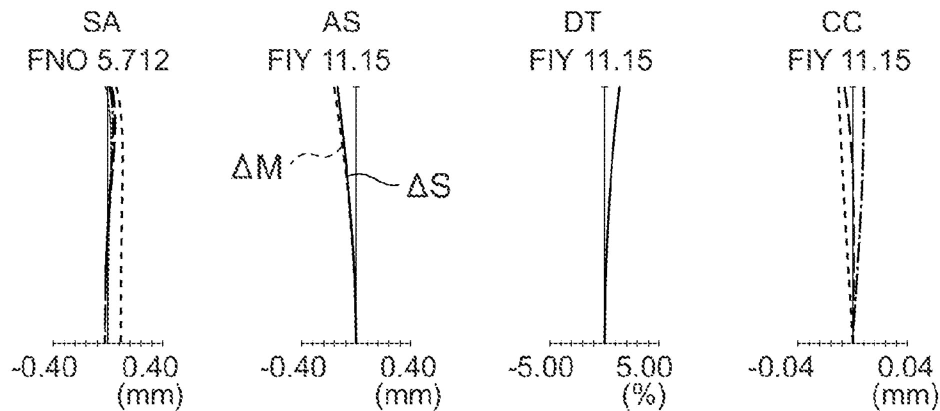

FIG. 8A, FIG. 8B, and FIG. 8C are diagrams showing a spherical aberration, an astigmatism, a distortion, and a chromatic aberration of magnification at the time of infinite object point focusing of the image forming optical system according to the third embodiment, where, FIG. 8A shows a state at the wide angle end, FIG. 8B shows an intermediate focal length state, and FIG. 8C shows a state at the telephoto end.

Figure 9A:
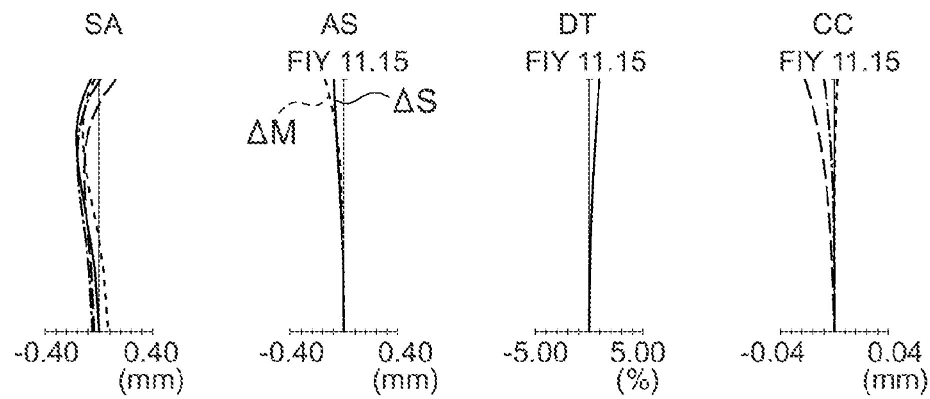
FIG. 9A, FIG. 9B, and FIG. 9C are diagrams showing the spherical aberration, the astigmatism, the distortion, and the chromatic aberration of magnification at the time of focusing at an object point which is 900 mm from the image plane according to the third embodiment, where.
Figure 9B:
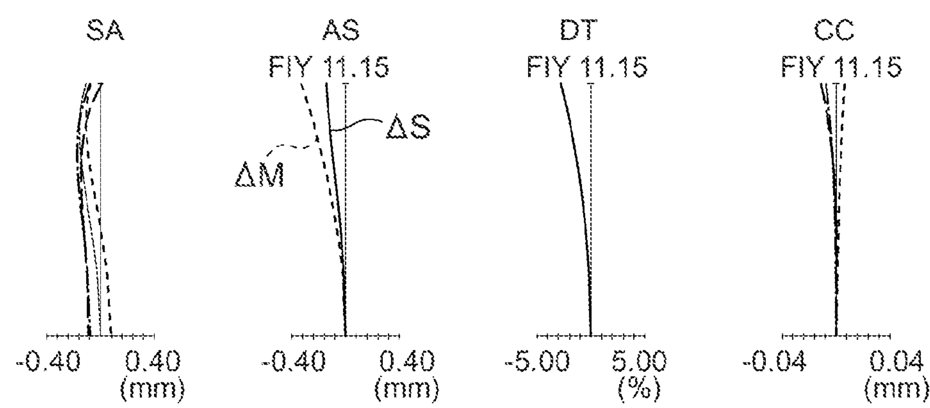
Figure 9C:
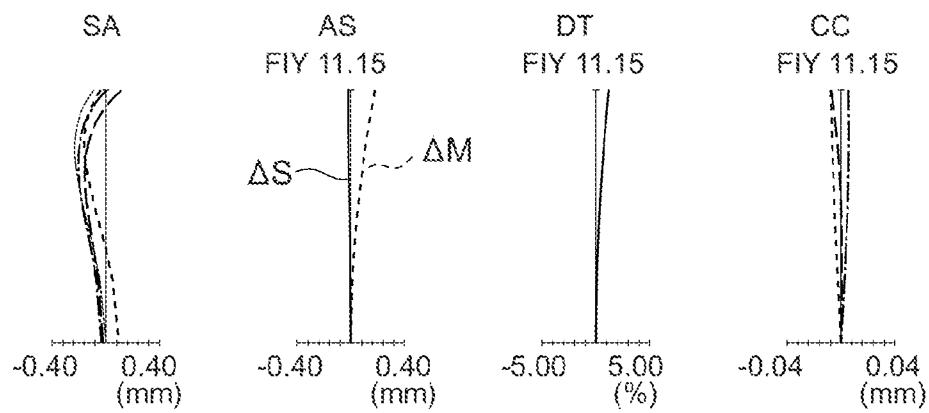

FIG. 9A, FIG. 9B, and FIG. 9C are diagrams showing the spherical aberration, the astigmatism, the distortion, and the chromatic aberration of magnification at the time of focusing at an object point which is 900 mm from the image plane according to the third embodiment, where, FIG. 9A shows a state at the wide angle end, FIG. 9B shows an intermediate state, and FIG. 9C shows a state at the telephoto end.

The image forming optical system according to the third embodiment, as shown in FIG. 7A, FIG. 7B, and FIG. 7C, includes in order from an object side, a first lens group G1 having a positive refractive power, a second lens group G2 having a negative refractive power, a third lens group G3 having a positive refractive power, which includes an aperture stop S, and a fourth lens group G4 having a negative refractive power.

The first lens group G1, in order from an object side, includes a biconvex positive lens L1 and a negative meniscus lens L2 having a convex surface directed toward an image side, and has a positive refractive power as a whole.

The second lens group G2, in order from the object side, includes a negative meniscus lens L3 having a convex surface directed toward the object side, a positive meniscus lens L4 having a convex surface directed toward the object side, and a negative meniscus lens L5 having a convex surface directed toward the image side.

The third lens group G3, in order from the object side, includes the aperture stop S, the biconvex positive lens L6, a cemented lens of a biconvex positive lens L7 and a negative meniscus lens L8 having a convex surface directed toward the image side, a biconcave negative lens L9, a biconvex positive lens L10, and a biconvex positive lens L11, and has a positive refractive power as a whole. Here, the biconvex positive lens L6, and the cemented lens of the biconvex positive lens L7 and the negative meniscus lens L8 having the convex surface directed toward the image side form a front group, which has a positive refractive power. The biconcave negative lens L9, the biconvex positive lens L10, and the biconvex positive lens L11 from a rear group, which has a positive refractive power.

The fourth lens group G4, in order from the object side, includes a positive meniscus lens L12 having a convex surface directed toward the image side, and a biconcave negative lens L13, and has a negative refractive power as a whole.

At the time of zooming from the wide angle end to the telephoto end, the first lens group G1 moves toward the object side while widening a distance from the second lens group G2. The second lens group G2 moves toward the image side while narrowing a distance from the third lens group G3, from the wide angle end up to the intermediate state, and moves toward the object side while narrowing the distance from the third lens group G3, from the intermediate state up to the telephoto state. The third lens group G3 moves toward the object side while narrowing a distance from the second lens group G2, from the wide angle end up to the telephoto end. The fourth lens group G4 moves toward the object side while widening a distance from the third lens group G3, from the wide angle end up to the intermediate state, and moves toward the object side while narrowing the distance from the third lens group G3, from the intermediate state up to the telephoto end. Moreover, the fourth lens group G4, at the time of focusing from infinity to a close point, moves toward the image side while widening the distance from the third lens group G3.

Figure 10A:
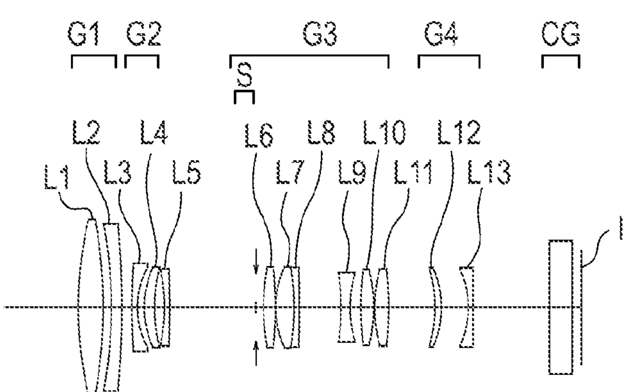
FIG. 10A, FIG. 10B, and FIG. 10C are cross-sectional views along an optical axis showing an optical arrangement at the time of infinite object point focusing of an image forming optical system according to a fourth embodiment of the present invention, where.
Figure 10B:
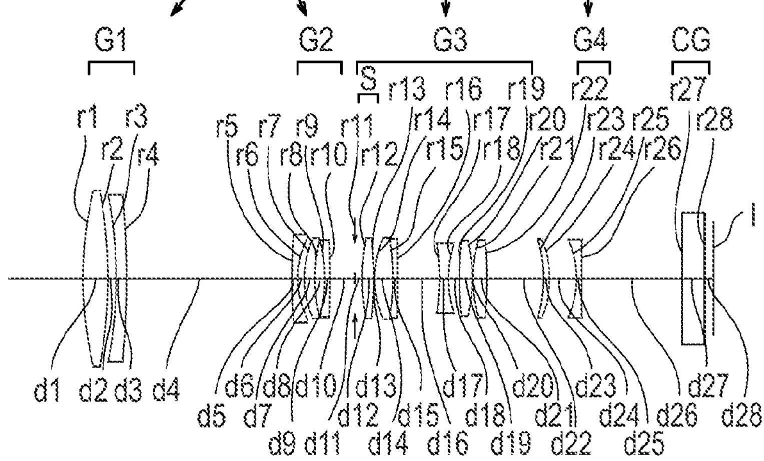
Figure 10C:
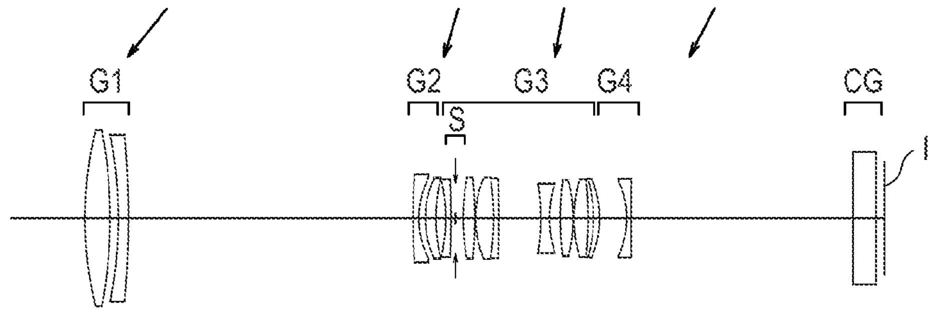

Next, an image forming optical system of an image pickup apparatus according to a fourth embodiment of the present invention will be described below. FIG. 10A, FIG. 10B, and FIG. 10C are cross-sectional views along an optical axis showing an optical arrangement at the time of infinite object point focusing of an image forming optical system according to the fourth embodiment of the present invention, where, FIG. 10A shows a state at a wide angle end, FIG. 10B shows an intermediate focal length state, and FIG. 10C shows a state at a telephoto end.

Figure 11A:
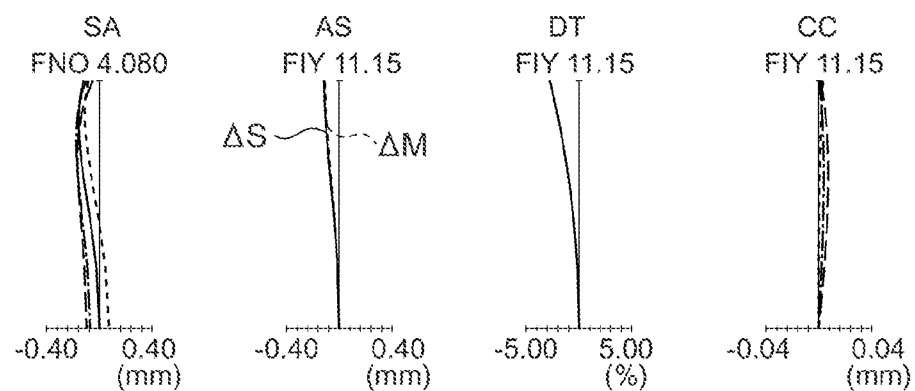
FIG. 11A, FIG. 11B, and FIG. 11C are diagrams showing a spherical aberration, an astigmatism, a distortion, and a chromatic aberration of magnification at the time of infinite object point focusing of the image forming optical system according to the fourth embodiment, where.
Figure 11B:
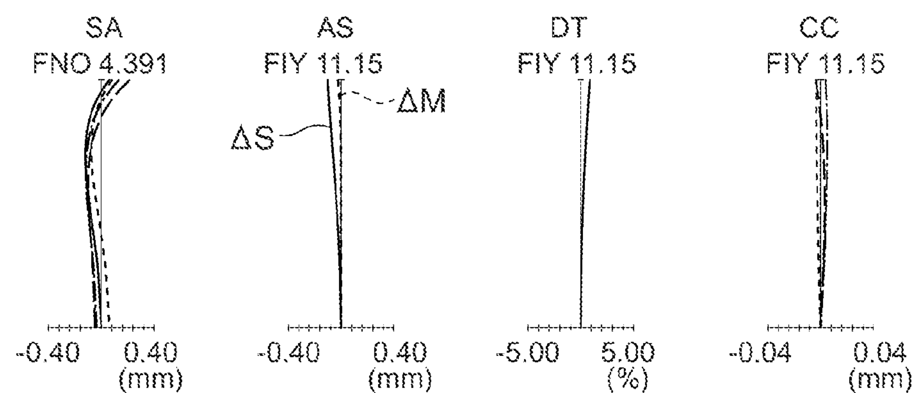
Figure 11C:
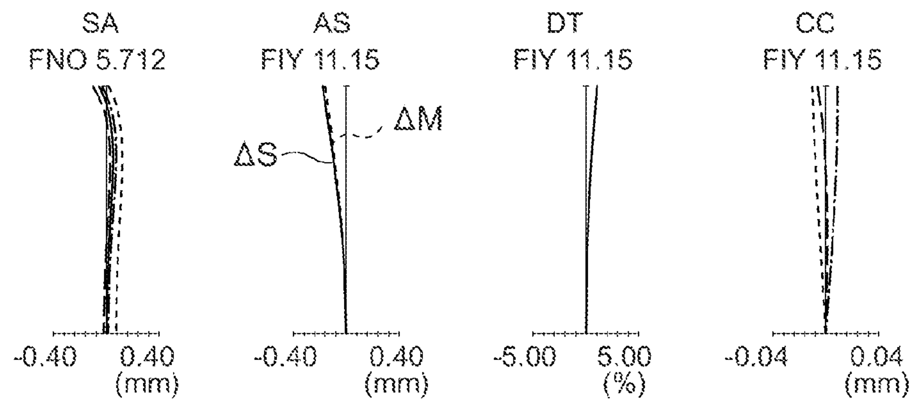

FIG. 11A, FIG. 11B, and FIG. 11C are diagrams showing a spherical aberration, an astigmatism, a distortion, and a chromatic aberration of magnification at the time of infinite object point focusing of the image forming optical system according to the fourth embodiment, where, FIG. 11A shows a state at the wide angle end, FIG. 11B shows an intermediate focal length state, and FIG. 11C shows a state at the telephoto end.

Figure 12A:
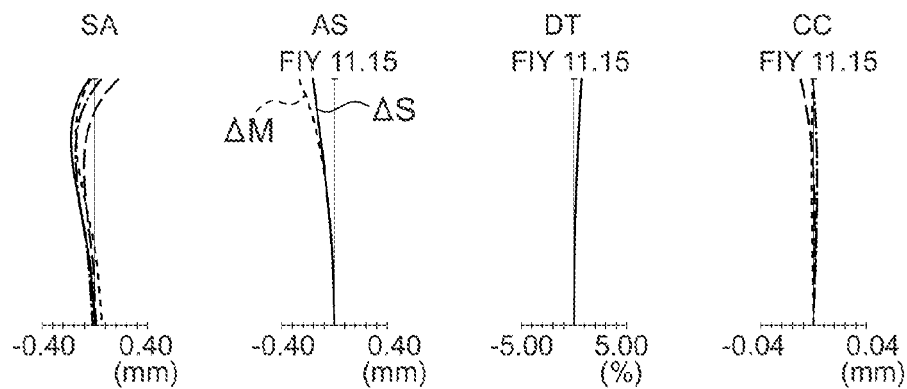
FIG. 12A, FIG. 12B, and FIG. 12C are diagrams showing the spherical aberration, the astigmatism, the distortion, and the chromatic aberration of magnification at the time of focusing at an object point which is 900 mm from the image plane according to the fourth embodiment, where.
Figure 12B:
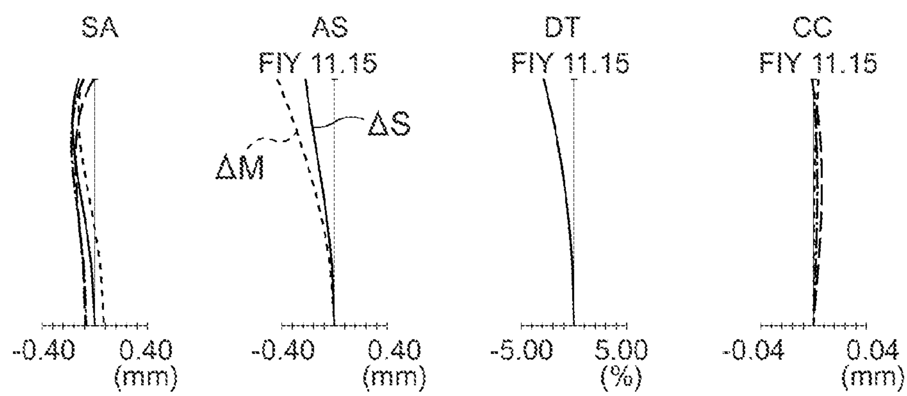
Figure 12C:
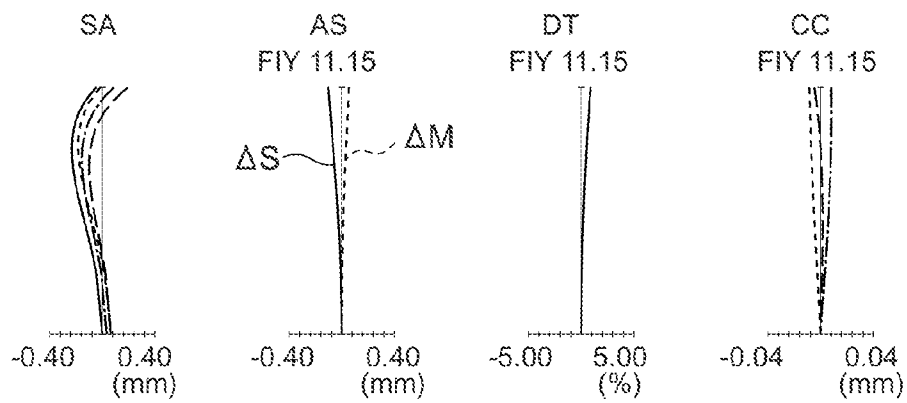

FIG. 12A, FIG. 12B, and FIG. 12C are diagrams showing the spherical aberration, the astigmatism, the distortion, and the chromatic aberration of magnification at the time of focusing at an object point which is 900 mm from the image plane according to the fourth embodiment, where, FIG. 12A shows a state at the wide angle end, FIG. 12B shows an intermediate state, and FIG. 12C shows a state at the telephoto end.

The image forming optical system according to the fourth embodiment, as shown in FIG. 10A, FIG. 10B, and FIG. 10C, includes in order from an object side, a first lens group G1 having a positive refractive power, a second lens group G2 having a negative refractive power, a third lens group G3 having a positive refractive power, which includes an aperture stop S, and a fourth lens group G4 having a negative refractive power.

The first lens group G1, in order from an object side, includes a biconvex positive lens L1 and a negative meniscus lens L2 having a convex surface directed toward an image side, and has a positive refractive power as a whole.

The second lens group G2, in order from the object side, includes a negative meniscus lens L3 having a convex surface directed toward the object side, a positive meniscus lens L4 having a convex surface directed toward the object side, and a negative meniscus lens L5 having a convex surface directed toward the image side, and has a negative refractive power as a whole.

The third lens group G3, in order from the object side, includes the aperture stop S, a biconvex positive lens L6, a cemented lens of a biconvex positive lens L7 and a negative meniscus lens L8 having a convex surface directed toward the image side, a biconcave negative lens L9, a biconvex positive lens L10, and a biconvex positive lens L11, and has a positive refractive power as a whole. Here, the biconvex positive lens L6 and the cemented lens of the biconvex positive lens L7 and the negative meniscus lens L8 having the convex surface directed toward the image side form a front group, which has a positive refractive power. The biconcave negative lens L9, the biconvex positive lens L10, and the biconvex positive lens L11 form a rear group, which has a positive refractive power.

The fourth lens group G4, in order from the object side, includes a positive meniscus lens L12 having a convex surface directed toward the image side, and a biconcave negative lens L13, and has a negative refractive power as a whole.

At the time of zooming from the wide angle end to the telephoto end, the first lens group G1 moves toward the object side while widening a distance from the second lens group G2. The second lens group G2 moves toward the image side while narrowing a distance from the third lens group G3, from the wide angle end up to the intermediate state, and moves toward the object side while narrowing the distance from the third lens group G3 from the intermediate state up to the telephoto state. The third lens group G3 moves toward the object side while narrowing a distance from the second lens group G2, from the wide angle end up to the telephoto end. The fourth lens group G4 moves toward the object side while widening a distance from the third lens group G3, from the wide angle end up to the intermediate state, and moves toward the object side while narrowing the distance from the third lens group G3, from the intermediate state up to the telephoto end. Moreover, the fourth lens group G4, at the time of focusing from infinity to a close point, moves toward the image side while widening the distance from the third lens group G3.

Figure 13A:
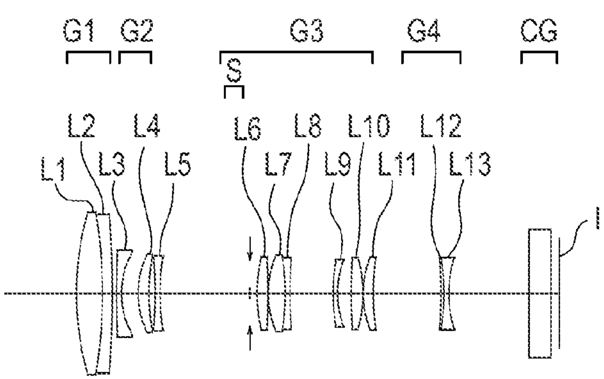
FIG. 13A, FIG. 13B, and FIG. 13C are cross-sectional views along an optical axis showing an optical arrangement at the time of infinite object point focusing of an image forming optical system according to a fifth embodiment of the present invention, where.
Figure 13B:
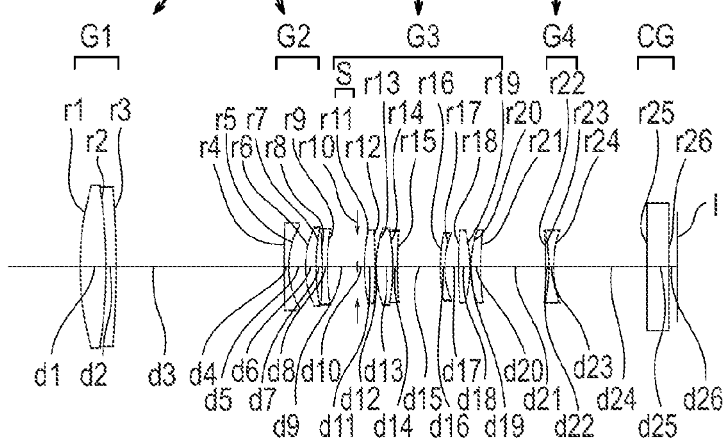
Figure 13C:
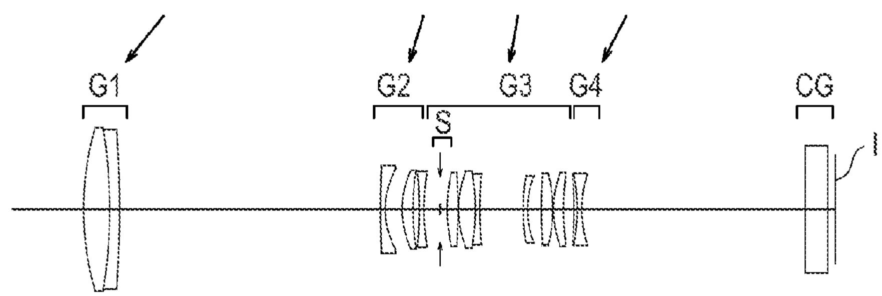

Next, an image forming optical system of an image pickup apparatus according to a fifth embodiment of the present invention will be described below. FIG. 13A, FIG. 13B, and FIG. 13C are cross-sectional views along an optical axis showing an optical arrangement at the time of infinite object point focusing of the image forming optical system according to the fifth embodiment of the present invention, where, FIG. 13A shows a state at a wide angle end, FIG. 13B shows an intermediate focal length state, and FIG. 13C shows a state at a telephoto end.

Figure 14A:
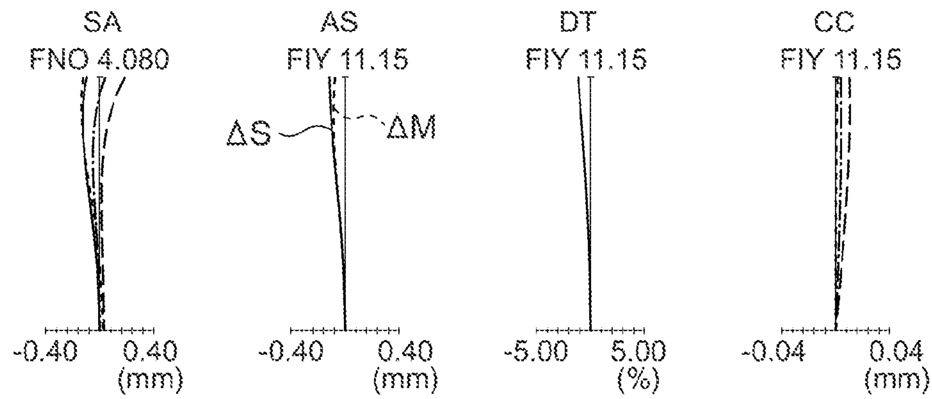
FIG. 14A, FIG. 14B, and FIG. 14C are diagrams showing a spherical aberration, an astigmatism, a distortion, and a chromatic aberration of magnification at the time of infinite object point focusing of the image forming optical system according to the fifth embodiment, where.
Figure 14B:
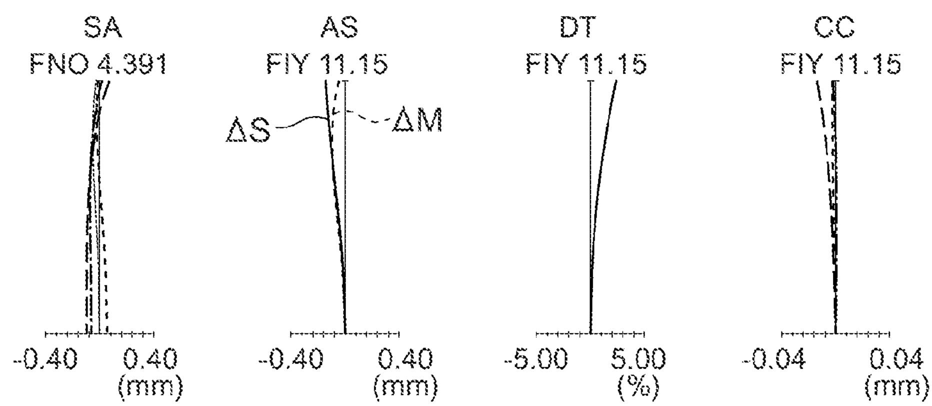
Figure 14C:
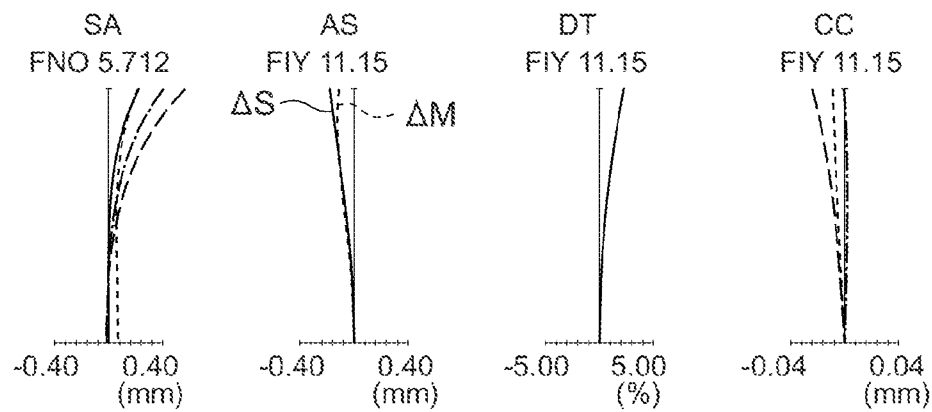

FIG. 14A, FIG. 14B, and FIG. 14C are diagrams showing a spherical aberration, an astigmatism, a distortion, and a chromatic aberration of magnification at the time of infinite object point focusing of the image forming optical system according to the fifth embodiment, where, FIG. 14A shows a state at the wide angle end, FIG. 14B shows an intermediate focal length state, and FIG. 14C shows a state at the telephoto end.

Figure 15A:
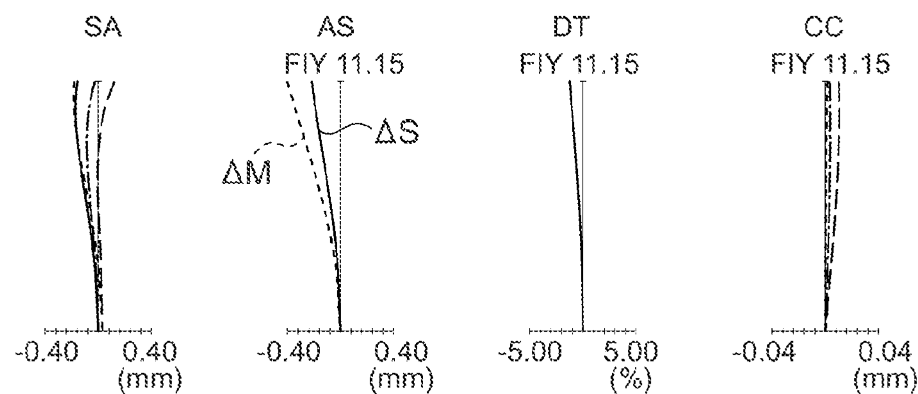
FIG. 15A, FIG. 15B, and FIG. 15C are diagrams showing the spherical aberration, the astigmatism, the distortion, and the chromatic aberration of magnification at the time of focusing at an object point which is 900 mm from the image plane according to the fifth embodiment, where.
Figure 15B:
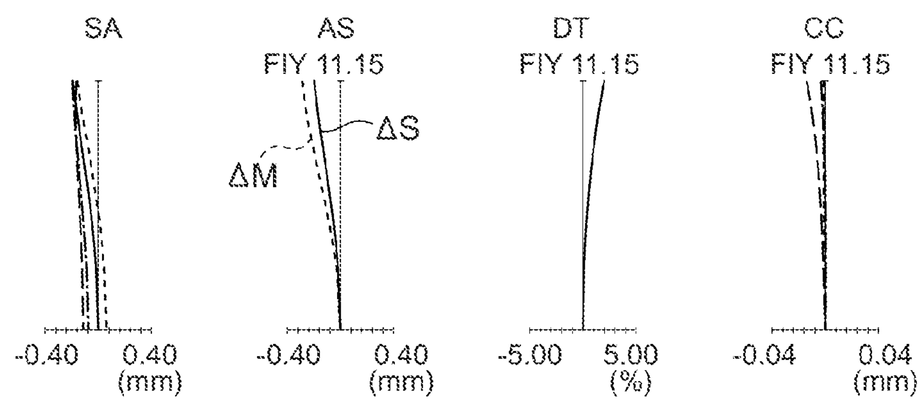
Figure 15C:
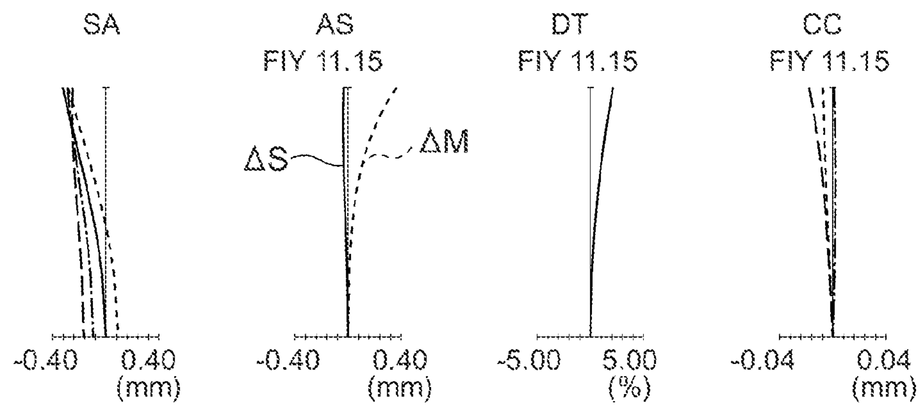

FIG. 15A, FIG. 15B, and FIG. 15C are diagrams showing the spherical aberration, the astigmatism, the distortion, and the chromatic aberration of magnification at the time of focusing at an object point which is 900 mm from the image plane according to the fifth embodiment, where, FIG. 15A shows a state at the wide angle end, FIG. 15B shows an intermediate state, and FIG. 15C shows a state at the telephoto end.

The image forming optical system according to the fifth embodiment, as shown in FIG. 13A, FIG. 13B, and FIG. 13C, includes in order from an object side, a first lens group G1 having a positive refractive power, a second lens group G2 having a negative refractive power, a third lens group G3 having a positive refractive power, which includes an aperture stop S, and a fourth lens group G4 having a negative refractive power.

The first lens group G1 includes a cemented lens of a biconvex positive lens L1 and a negative meniscus lens L2 having a convex surface directed toward an image side, in order from the object side, and has a positive refractive power as a whole.

The second lens group G2, in order from the object side, includes a negative meniscus lens L3 having a convex surface directed toward the object side, a positive meniscus lens L4 having a convex surface directed toward the object side, and a biconcave negative lens L5, and has a negative refractive power as a whole.

The third lens group G3, in order from the object side, includes the aperture stop S, a biconvex positive lens L6, a cemented lens of a biconvex positive lens L7 and a biconcave negative lens L8, a negative meniscus lens L9 having a convex surface directed toward the object side, a biconvex positive lens L10, and a positive meniscus lens L11 having a convex surface directed toward the object side, and has a positive refractive power as a whole. Here, the biconvex positive lens L6, and the cemented lens of the biconvex positive lens L7 and the biconcave negative lens L8 form a front group, which has a positive refractive power. The negative meniscus lens L9 having the convex surface directed toward the object side, the biconvex positive lens L10, and the positive meniscus lens L11 having the convex surface directed toward the object side form a rear group, which has a positive refractive power.

The fourth lens group G4 includes a cemented lens of a positive meniscus lens L12 having a convex surface directed toward the image side and a biconcave negative lens L13, and has a negative refractive power as a whole.

At the time of zooming from the wide angle end to the telephoto end, the first lens group G1 moves toward the object side while widening a distance from the second lens group G2. The second lens group G2 moves toward the image side while narrowing a distance from the third lens group G3, from the wide angle end up to the intermediate state, and moves toward the object side while narrowing the distance from the third lens group G3, from the intermediate state up to the telephoto state. The third lens group G3 moves toward the object side while narrowing a distance from the second lens group G2, from the wide angle end up to the telephoto end. The fourth lens group G4 moves toward the object side while widening a distance from the third lens group G3, from the wide angle end up to the intermediate state, and moves toward the object side while narrowing the distance from the third lens group G3, from the intermediate state up to the telephoto end. Moreover, the fourth lens group G4, at the time of focusing from infinity to a close point, moves toward the image side while widening the distance from the third lens group G3.

Figure 16A:
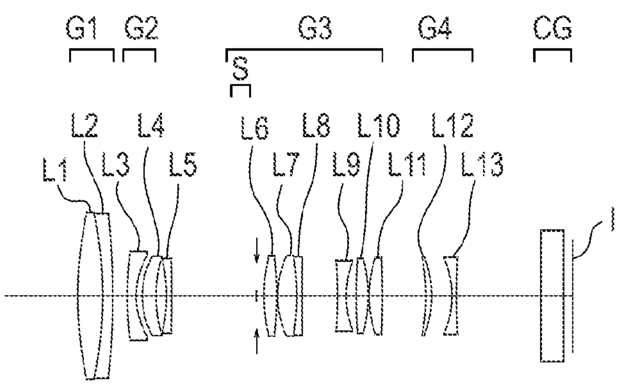
FIG. 16A, FIG. 16B, and FIG. 16C are cross-sectional views along an optical axis showing an optical arrangement at the time of infinite object point focusing of an image forming optical system according to a sixth embodiment of the present invention, where.
Figure 16B:
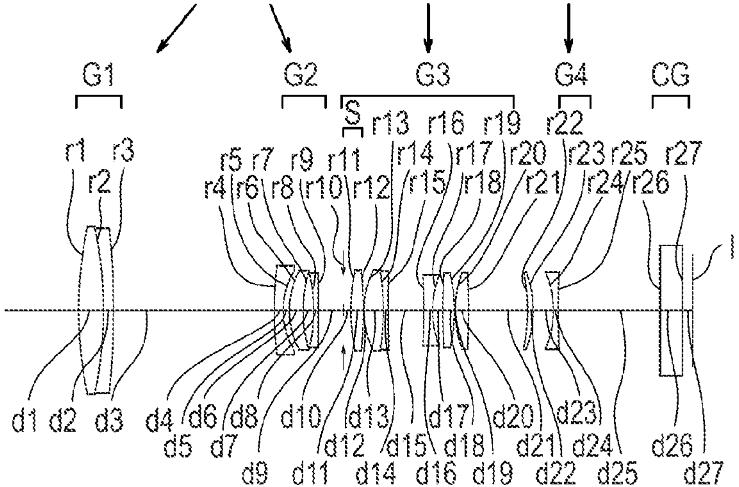
Figure 16C:
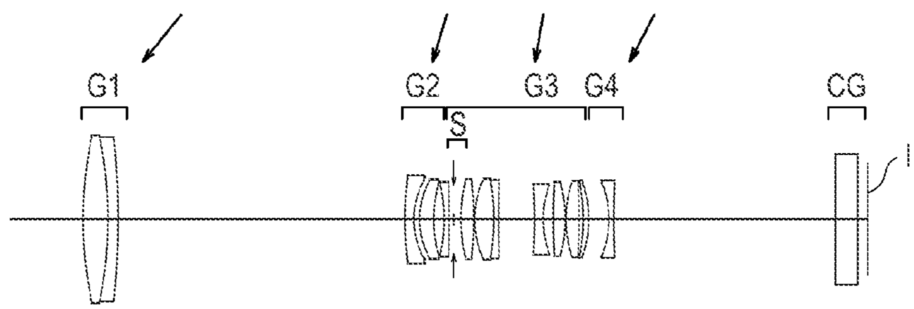

Next, an image forming optical system of an image pickup apparatus according to a sixth embodiment of the present invention will be described below. FIG. 16A, FIG. 16B, and FIG. 16C are cross-sectional views along an optical axis showing an optical arrangement at the time of infinite object point focusing of the image forming optical system according to the sixth embodiment of the present invention, where, FIG. 16A shows a state at a wide angle end, FIG. 16B shows an intermediate focal length state, and FIG. 16C shows a state at a telephoto end.

Figure 17A:
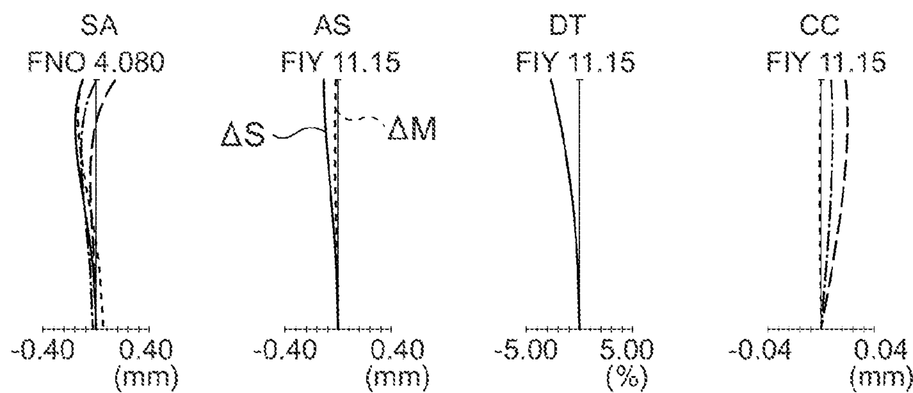
FIG. 17A, FIG. 17B, and FIG. 17C are diagrams showing a spherical aberration, an astigmatism, a distortion, and a chromatic aberration of magnification at the time of infinite object point focusing of the image forming optical system according to the sixth embodiment, where.
Figure 17B:
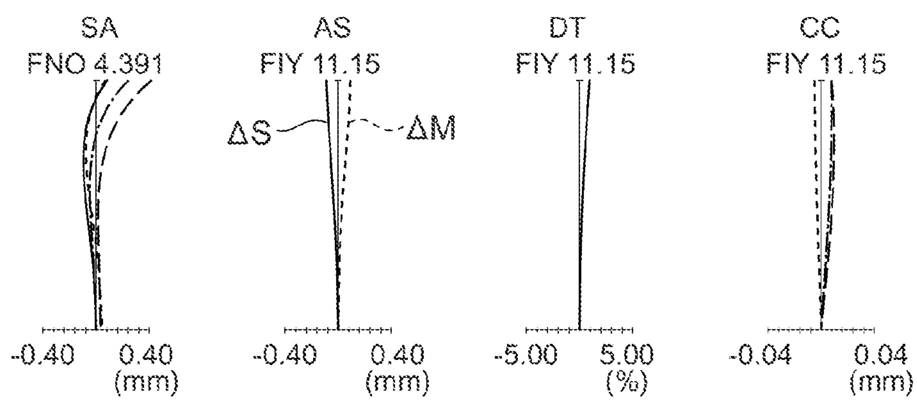
Figure 17C:
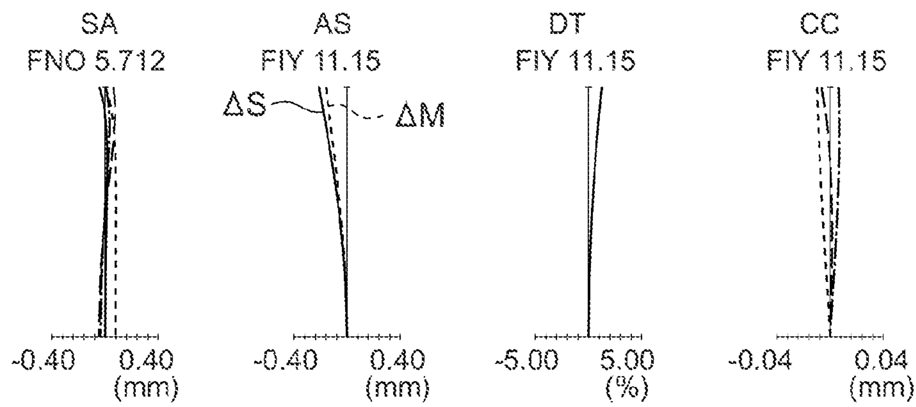

FIG. 17A, FIG. 17B, and FIG. 17C are diagrams showing a spherical aberration, an astigmatism, a distortion, and a chromatic aberration of magnification at the time of infinite object point focusing of the image forming optical system according to the sixth embodiment, where, FIG. 17A shows a state at the wide angle end, FIG. 17B shows an intermediate focal length state, and FIG. 17C shows a state at the telephoto end.

Figure 18A:
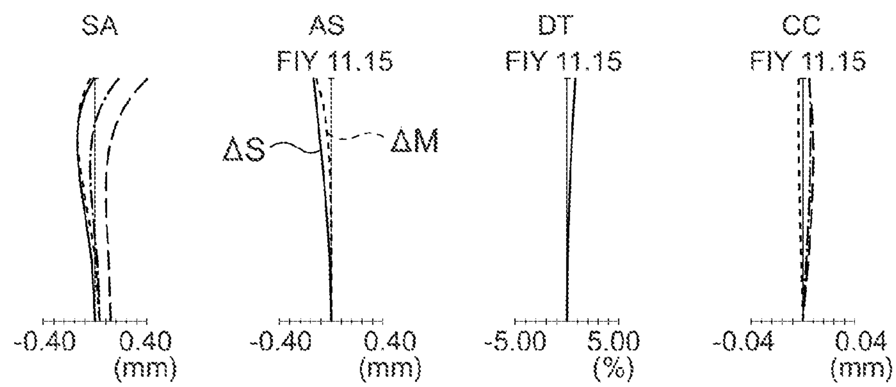
FIG. 18A, FIG. 18B, and FIG. 18C are diagrams showing the spherical aberration, the astigmatism, the distortion, and the chromatic aberration of magnification at the time of focusing at an object point which is 900 mm from the image plane according to the sixth embodiment, where.
Figure 18B:
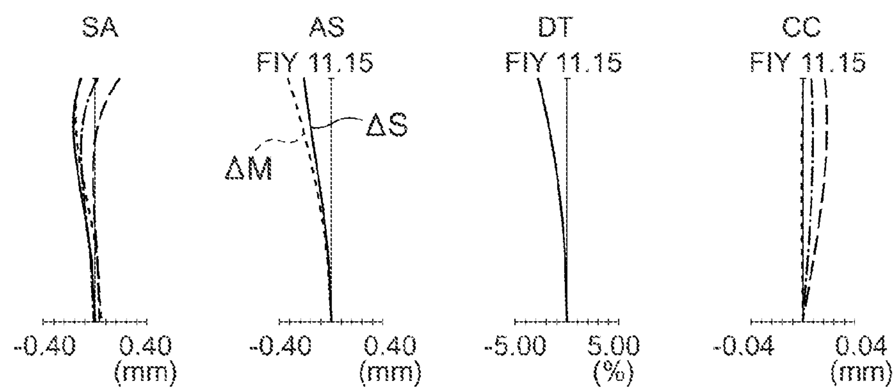
Figure 18C:
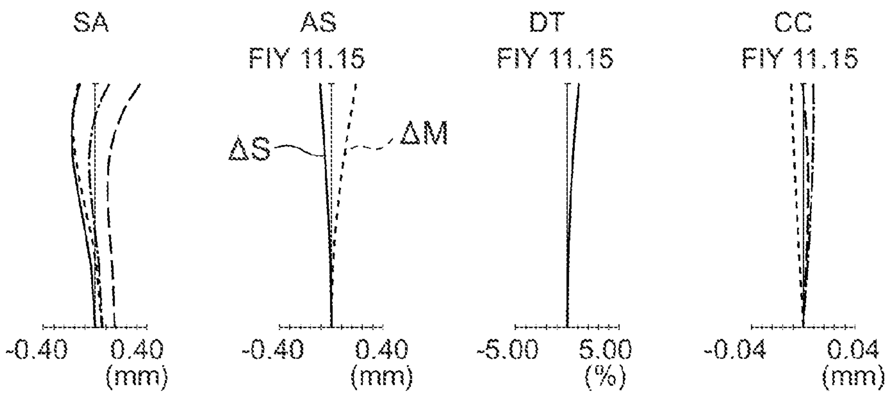

FIG. 18A, FIG. 18B, and FIG. 18C are diagrams showing the spherical aberration, the astigmatism, the distortion, and the chromatic aberration of magnification at the time of focusing at an object point which is 900 mm from the image plane according to the sixth embodiment, where, FIG. 18A shows a state at the wide angle end, FIG. 18B shows an intermediate state, and FIG. 18C shows a state at the telephoto end.

The image forming optical system according to the sixth embodiment, as shown in FIG. 16A, FIG. 16B, and FIG. 16C, includes in order from an object side, a first lens group G1 having a positive refractive power, a second lens group G2 having a negative refractive power, a third lens group G3 having a positive refractive power, which includes an aperture stop S, and a fourth lens group G4 having a negative refractive power.

The first lens group G1 includes a cemented lens of a biconvex positive lens L1 and a negative meniscus lens L2 having a convex surface directed toward an image side, in order form the object side, and has a positive refractive power as a whole.

The second lens group G2, in order from the object side, includes a negative meniscus lens L3 having a convex surface directed toward the object side, a positive meniscus lens L4 having a convex surface directed toward the object side, and a negative meniscus lens L5 having a convex surface directed toward the image side, and has a negative refractive power as a whole.

The third lens group G3, in order from the object side, includes the aperture stop S, a biconvex positive lens L6, a cemented lens of a biconvex positive lens L7 and a biconcave negative lens L8, a biconcave negative lens L9, a biconvex positive lens L10, and a biconvex positive lens L11, and has a positive refractive power as a whole. Here, the biconvex positive lens L6, and the cemented lens of the biconvex positive lens L7 and the biconcave negative lens L8 form a front group, which has a positive refractive power. The biconcave negative lens L9, the biconvex positive lens L10, and the biconvex positive lens L11 form a rear group, which has a positive refractive power.

The fourth lens group G4, in order from the object side, includes a positive meniscus lens L12 having a convex surface directed toward the image side and a biconcave negative lens L13, and has a negative refractive power as a whole.

At the time of zooming from the wide angle end to the telephoto end, the first lens group G1 moves toward the object side while widening a distance from the second lens group G2. The second lens group G2 moves toward the image side while narrowing a distance from the third lens group G3, from the wide angle end up to the intermediate state, and moves toward the object side while narrowing the distance from the third lens group G3, from the intermediate state up to the telephoto state. The third lens group G3 moves toward the object side while narrowing a distance from the second lens group G2, from the wide angle end up to the telephoto end. The fourth lens group G4 moves toward the object side while widening a distance from the third lens group G3, from the wide angle end up to the intermediate state, and moves toward the object side while narrowing the distance from the third lens group G3, from the intermediate state up to the telephoto end. Moreover, the fourth lens group G4, at the time of focusing form infinity to a close point, moves toward the image side while widening the distance from the third lens group G3.

Numerical data of each embodiment described above is shown below. Each of r1, r2, . . . denotes radius of curvature of each lens surface, each of d1, d2, . . . denotes lens thickness or an air distance between two lenses, each of nd1, nd2, . . . denotes a refractive index of each lens for a d-line, each of νd1, νd2, . . . denotes an Abbe's number for each lens, $F_{NO}$ denotes an F number, f denotes a focal length of the entire zoom lens system, and D0 denotes a distance from the object to the first surface of the lens system.

Numerical data of lenses according to each embodiment is shown below.

In the numerical data of lenses according to each embodiment, R denotes radius of curvature of each lens surface, D denotes each lens thickness or an air distance between two lenses, Nd denotes a refractive index of each lens for a d-line, and νd denotes an Abbe's number for each lens. Further, D0 denotes a distance from the object to the first surface of the lens system.

EXAMPLE 1

Unit mm

Surface data

| Surface no. | r | d | nd | νd |
|---|---|---|---|---|
| Object plane | ∞ | ∞ | | |
| 1 | 63.709 | 5.50 | 1.48749 | 70.23 |
| 2 | −109.414 | 2.10 | 1.84666 | 23.78 |
| 3 | −222.855 | Variable | | |
| 4 | 60.135 | 1.00 | 1.63854 | 55.38 |
| 5 | 15.437 | 2.57 | | |
| 6 | 16.558 | 1.91 | 1.84666 | 23.78 |
| 7 | 24.721 | 2.31 | | |
| 8 | −38.326 | 1.00 | 1.65100 | 56.16 |
| 9 | 372.592 | Variable | | |
| 10(stop) | ∞ | 1.50 | | |
| 11 | 39.609 | 2.26 | 1.51633 | 64.14 |
| 12 | −97.377 | 0.15 | | |
| 13 | 23.841 | 3.45 | 1.49700 | 81.54 |
| 14 | −44.087 | 1.00 | 1.91082 | 35.25 |
| 15 | 236.915 | 11.18 | | |
| 16 | 39.347 | 1.09 | 1.80100 | 34.97 |
| 17 | 19.431 | 2.19 | | |
| 18 | −482.622 | 1.95 | 1.48749 | 70.23 |
| 19 | −31.546 | 0.15 | | |
| 20 | 21.469 | 2.53 | 1.60311 | 60.64 |
| 21 | 131.413 | Variable | | |
| 22 | −98.879 | 0.70 | 1.63387 | 23.38 |
| 23 | −38.873 | 1.00 | 1.51633 | 64.14 |
| 24 | 25.822 | Variable | | |
| 25 | ∞ | 4.70 | 1.51633 | 64.14 |
| 26 | ∞ | 1.60 | | |
| Image plane(Light receiving surface) | ∞ | | | |

Various data

| | Wide angle | Intermediate | Telephoto |
|---|---|---|---|
| Focal length | 40.83 | 77.45 | 146.88 |
| Fno. | 4.08 | 4.39 | 5.71 |
| Angle of field 2ω | 30.94 | 16.03 | 8.49 |
| At the time of infinite object point focusing | | | |
| d0 | ∞ | ∞ | ∞ |
| d3 | 0.90 | 34.28 | 54.07 |
| d9 | 18.58 | 6.32 | 3.40 |
| d21 | 13.14 | 13.50 | 2.55 |
| d24 | 17.31 | 19.89 | 46.72 |
| At the time of focusing at an object point which is 900 mm from the image plane | | | |
| d0 | 791.06 | 766.69 | 734.50 |
| d3 | 0.90 | 34.28 | 54.07 |
| d9 | 18.58 | 6.32 | 3.40 |
| d21 | 14.72 | 18.62 | 9.43 |
| d24 | 15.73 | 14.77 | 39.84 |

Table of refractive index
List of refractive index per wavelength of medium of glass material used in the present embodiment

| Glass material | 587.56 | 656.27 | 486.13 | 435.84 |
|---|---|---|---|---|
| L7 | 1.496999 | 1.495136 | 1.501231 | 1.504506 |
| L12 | 1.633870 | 1.626381 | 1.653490 | 1.671610 |
| F | 1.516330 | 1.513855 | 1.521905 | 1.526213 |
| L11 | 1.603112 | 1.600079 | 1.610024 | 1.615408 |
| L3 | 1.638539 | 1.635051 | 1.646582 | 1.652906 |
| L1, L10 | 1.487490 | 1.485344 | 1.492285 | 1.495963 |
| L5 | 1.650996 | 1.647485 | 1.659076 | 1.665429 |
| L9 | 1.800999 | 1.794275 | 1.817182 | 1.830612 |
| L2, L4 | 1.846660 | 1.836488 | 1.872096 | 1.894186 |
| L8 | 1.910823 | 1.903235 | 1.929074 | 1.944115 |
| L6, L13 | 1.516330 | 1.513855 | 1.521905 | 1.526213 |

EXAMPLE 2

Unit mm

Surface data

| Surface no. | r | d | nd | νd |
|---|---|---|---|---|
| Object plane | ∞ | ∞ | | |
| 1 | 76.255 | 5.10 | 1.48749 | 70.23 |
| 2 | −86.712 | 2.10 | 1.80518 | 25.42 |
| 3 | −162.511 | Variable | | |
| 4 | 3399.854 | 1.00 | 1.72916 | 54.68 |
| 5 | 17.987 | 1.15 | | |
| 6 | 19.203 | 2.25 | 1.84666 | 23.78 |
| 7 | 37.086 | 1.61 | | |
| 8 | −34.840 | 1.00 | 1.71300 | 53.87 |
| 9 | −84.392 | Variable | | |
| 10(stop) | ∞ | 1.50 | | |
| 11 | 46.995 | 2.38 | 1.51633 | 64.14 |
| 12 | −59.183 | 0.28 | | |
| 13 | 22.545 | 4.06 | 1.48749 | 70.23 |
| 14 | −41.326 | 1.00 | 1.90366 | 31.32 |
| 15 | 782.855 | 9.42 | | |
| 16 | −87.571 | 1.80 | 1.83400 | 37.16 |
| 17 | 26.470 | 3.10 | | |
| 18 | 100.099 | 2.60 | 1.51633 | 64.14 |
| 19 | −28.402 | 0.15 | | |
| 20 | 28.981 | 2.55 | 1.60311 | 60.64 |
| 21 | −101.096 | Variable | | |
| 22 | −45.486 | 0.59 | 1.63387 | 23.38 |
| 23 | −26.259 | 4.47 | | |
| 24 | −22.469 | 1.00 | 1.57099 | 50.80 |
| 25 | 51.356 | Variable | | |
| 26 | ∞ | 4.50 | 1.51633 | 64.14 |
| 27 | ∞ | 1.50 | | |
| Image plane(Light receiving surface) | ∞ | | | |

Various data

| | Wide angle | Intermediate | Telephoto |
|---|---|---|---|
| Focal length | 40.91 | 77.49 | 146.95 |
| Fno. | 4.08 | 4.39 | 5.71 |
| Angle of field 2ω | 31.25 | 16.15 | 8.54 |
| At the time of infinite object point focusing | | | |
| d0 | ∞ | ∞ | ∞ |
| d3 | 0.90 | 36.13 | 56.50 |
| d9 | 17.62 | 5.12 | 1.00 |
| d21 | 10.09 | 10.77 | 1.39 |
| d25 | 17.10 | 20.30 | 44.85 |

-continued

| Unit mm | | | |
|---|---|---|---|
| At the time of focusing at an object point which is 900 mm from the image plane | | | |
| d0 | 798.79 | 772.27 | 740.91 |
| d3 | 0.90 | 36.13 | 56.50 |
| d9 | 17.62 | 5.12 | 1.00 |
| d21 | 11.72 | 15.83 | 8.40 |
| d25 | 15.47 | 15.24 | 37.84 |

Table of refractive index
List of refractive index per wavelength of medium of glass material used in the present embodiment

| Glass material | 587.56 | 656.27 | 486.13 | 435.84 |
|---|---|---|---|---|
| L12 | 1.633870 | 1.626381 | 1.653490 | 1.671610 |
| L13 | 1.570989 | 1.567616 | 1.578856 | 1.585136 |
| F | 1.516330 | 1.513855 | 1.521905 | 1.526213 |
| L11 | 1.603112 | 1.600079 | 1.610024 | 1.615408 |
| L1, L7 | 1.487490 | 1.485344 | 1.492285 | 1.495963 |
| L9 | 1.834000 | 1.827376 | 1.849819 | 1.862779 |
| L3 | 1.729157 | 1.725101 | 1.738436 | 1.745696 |
| L5 | 1.712995 | 1.708974 | 1.722210 | 1.729434 |
| L4 | 1.846660 | 1.836488 | 1.872096 | 1.894186 |
| L2 | 1.805181 | 1.796106 | 1.827775 | 1.847283 |
| L8 | 1.903660 | 1.895260 | 1.924120 | 1.941280 |
| L6, L10 | 1.516330 | 1.513855 | 1.521905 | 1.526213 |

EXAMPLE 3

Unit mm

Surface data

| Surface no. | r | d | nd | νd |
|---|---|---|---|---|
| Object plane | ∞ | ∞ | | |
| 1 | 74.021 | 5.10 | 1.48749 | 70.23 |
| 2 | −95.003 | 1.02 | | |
| 3 | −92.454 | 2.10 | 1.80518 | 25.42 |
| 4 | −182.076 | Variable | | |
| 5 | 2229.024 | 1.00 | 1.72916 | 54.68 |
| 6 | 19.773 | 1.26 | | |
| 7 | 20.950 | 2.01 | 1.84666 | 23.78 |
| 8 | 38.779 | 1.95 | | |
| 9 | −32.760 | 1.00 | 1.71300 | 53.87 |
| 10 | −88.704 | Variable | | |
| 11(stop) | ∞ | 1.70 | | |
| 12 | 56.044 | 2.28 | 1.51633 | 64.14 |
| 13 | −64.509 | 0.14 | | |
| 14 | 21.499 | 4.22 | 1.48749 | 70.23 |
| 15 | −40.786 | 1.00 | 1.90366 | 31.32 |
| 16 | −148.154 | 9.23 | | |
| 17 | −43.203 | 1.80 | 1.83400 | 37.16 |
| 18 | 26.121 | 2.72 | | |
| 19 | 93.813 | 2.70 | 1.51633 | 64.14 |
| 20 | −26.277 | 0.14 | | |
| 21 | 29.694 | 2.65 | 1.60311 | 60.64 |
| 22 | −78.103 | Variable | | |
| 23 | −35.969 | 0.90 | 1.63400 | 22.88 |
| 24 | −22.585 | 4.38 | | |
| 25 | −19.718 | 1.00 | 1.57099 | 50.80 |
| 26 | 87.496 | Variable | | |
| 27 | ∞ | 4.70 | 1.51633 | 64.14 |
| 28 | ∞ | 1.60 | | |
| Image plane(Light receiving surface) | ∞ | | | |

Various data

| | Wide angle | Intermediate | Telephoto |
|---|---|---|---|
| Focal length | 40.88 | 77.42 | 146.91 |
| Fno. | 4.08 | 4.39 | 5.71 |
| Angle of field 2ω | 31.31 | 16.19 | 8.56 |

-continued

| Unit mm | | | |
|---|---|---|---|
| At the time of infinite object point focusing | | | |
| D0 | ∞ | ∞ | ∞ |
| D4 | 1.17 | 35.49 | 56.69 |
| D10 | 17.62 | 5.12 | 1.00 |
| D22 | 9.49 | 10.87 | 1.23 |
| D26 | 16.81 | 19.99 | 44.75 |
| At the time of focusing at an object point which is 900 mm from the image plane | | | |
| D0 | 798.12 | 771.89 | 739.94 |
| D4 | 1.17 | 35.49 | 56.69 |
| D10 | 17.62 | 5.12 | 1.00 |
| D22 | 11.24 | 16.36 | 8.85 |
| D26 | 15.06 | 14.50 | 37.13 |

Table of refractive index
List of refractive index per wavelength of medium of glass material used in the present embodiment

| Glass material | 587.56 | 656.27 | 486.13 | 435.84 |
|---|---|---|---|---|
| L12 | 1.633997 | 1.626282 | 1.653988 | 1.673212 |
| L13 | 1.570989 | 1.567616 | 1.578856 | 1.585136 |
| F | 1.516330 | 1.513855 | 1.521905 | 1.526213 |
| L11 | 1.603112 | 1.600079 | 1.610024 | 1.615408 |
| L1, L7 | 1.487490 | 1.485344 | 1.492285 | 1.495963 |
| L9 | 1.834000 | 1.827376 | 1.849819 | 1.862779 |
| L3 | 1.729157 | 1.725101 | 1.738436 | 1.745696 |
| L5 | 1.712995 | 1.708974 | 1.722210 | 1.729434 |
| L4 | 1.846660 | 1.836488 | 1.872096 | 1.894186 |
| L2 | 1.805181 | 1.796106 | 1.827775 | 1.847283 |
| L8 | 1.903660 | 1.895260 | 1.924120 | 1.941280 |
| L6, L10 | 1.516330 | 1.513855 | 1.521905 | 1.526213 |

EXAMPLE 4

Unit mm

Unit mm

Surface data

| Surface no. | r | d | nd | νd |
|---|---|---|---|---|
| Object plane | ∞ | ∞ | | |
| 1 | 77.785 | 5.10 | 1.48749 | 70.23 |
| 2 | −95.673 | 1.65 | | |
| 3 | −91.630 | 2.10 | 1.80518 | 25.42 |
| 4 | −183.616 | Variable | | |
| 5 | 124.018 | 1.21 | 1.72916 | 54.68 |
| 6 | 18.326 | 1.31 | | |
| 7 | 19.247 | 2.13 | 1.84666 | 23.78 |
| 8 | 34.161 | 2.04 | | |
| 9 | −33.350 | 1.00 | 1.71300 | 53.87 |
| 10 | −210.033 | Variable | | |
| 11(stop) | ∞ | 1.50 | | |
| 12 | 42.697 | 2.39 | 1.51633 | 64.14 |
| 13 | −76.824 | 0.14 | | |
| 14 | 20.663 | 3.72 | 1.48749 | 70.23 |
| 15 | −50.841 | 1.00 | 1.90366 | 31.32 |
| 16 | −323.095 | 8.54 | | |
| 17 | −48.670 | 1.80 | 1.83400 | 37.16 |
| 18 | 22.896 | 2.22 | | |
| 19 | 62.854 | 2.64 | 1.51633 | 64.14 |
| 20 | −31.114 | 0.15 | | |
| 21 | 28.683 | 2.87 | 1.60311 | 60.64 |
| 22 | −73.338 | Variable | | |
| 23 | −28.784 | 1.24 | 1.64800 | 22.00 |
| 24 | −20.986 | 5.52 | | |
| 25 | −19.000 | 1.00 | 1.57099 | 50.80 |
| 26 | 3214.295 | Variable | | |

-continued

| Unit mm | | | | |
|---|---|---|---|---|
| 27 | ∞ | 4.70 | 1.51633 | 64.14 |
| 28 | ∞ | 1.60 | | |
| Image plane(Light receiving surface) | ∞ | | | |

| Various data | | | |
|---|---|---|---|
| | Wide angle | Intermediate | Telephoto |
| Focal length | 40.62 | 77.66 | 146.36 |
| Fno. | 4.08 | 4.39 | 5.71 |
| Angle of field 2ω | 31.53 | 16.21 | 8.62 |
| At the time of infinite object point focusing | | | |
| d0 | ∞ | ∞ | ∞ |
| d4 | 2.04 | 33.67 | 57.93 |
| d10 | 17.62 | 5.12 | 1.00 |
| d22 | 9.46 | 11.45 | 1.09 |
| d26 | 15.51 | 20.42 | 45.12 |
| At the time of focusing at an object point which is 900 mm from the image plane | | | |
| d0 | 797.57 | 771.64 | 737.26 |
| d4 | 2.04 | 33.67 | 57.93 |
| d10 | 17.62 | 5.12 | 1.00 |
| d22 | 11.67 | 17.99 | 10.32 |
| d26 | 13.30 | 13.89 | 35.89 |

Table of refractive index
List of refractive index per wavelength of medium of glass material used in the present embodiment

| Glass material | 587.56 | 656.27 | 486.13 | 435.84 |
|---|---|---|---|---|
| L8 | 1.903660 | 1.895260 | 1.924120 | 1.941280 |
| L6, L10 | 1.516330 | 1.513855 | 1.521905 | 1.526213 |
| L13 | 1.570989 | 1.567616 | 1.578856 | 1.585136 |
| F | 1.516330 | 1.513855 | 1.521905 | 1.526213 |
| L11 | 1.603112 | 1.600079 | 1.610024 | 1.615408 |
| L1, L7 | 1.487490 | 1.485344 | 1.492285 | 1.495963 |
| L9 | 1.834000 | 1.827376 | 1.849819 | 1.862779 |
| L12 | 1.647997 | 1.639827 | 1.669278 | 1.690832 |
| L3 | 1.729157 | 1.725101 | 1.738436 | 1.745696 |
| L5 | 1.712995 | 1.708974 | 1.722210 | 1.729434 |
| L4 | 1.846660 | 1.836488 | 1.872096 | 1.894186 |
| L2 | 1.805181 | 1.796106 | 1.827775 | 1.847283 |

EXAMPLE 5

Unit mm

Surface data

| Surface no. | r | d | nd | νd |
|---|---|---|---|---|
| Object plane | ∞ | ∞ | | |
| 1 | 62.889 | 5.50 | 1.48749 | 70.23 |
| 2 | −108.347 | 2.10 | 1.84666 | 23.78 |
| 3 | −224.250 | Variable | | |
| 4 | 191.134 | 1.00 | 1.63854 | 55.38 |
| 5 | 17.569 | 3.56 | | |
| 6 | 19.477 | 2.26 | 1.80518 | 25.42 |
| 7 | 46.237 | 1.35 | | |
| 8 | −85.640 | 1.00 | 1.65844 | 50.88 |
| 9 | 48.262 | Variable | | |
| 10(stop) | ∞ | 1.50 | | |
| 11 | 35.110 | 2.26 | 1.51633 | 64.14 |
| 12 | −125.366 | 0.15 | | |
| 13 | 22.227 | 3.55 | 1.49700 | 81.54 |
| 14 | −45.474 | 1.00 | 1.91082 | 35.25 |
| 15 | 114.115 | 9.07 | | |
| 16 | 38.900 | 0.93 | 1.80100 | 34.97 |
| 17 | 19.453 | 2.92 | | |
| 18 | 132.785 | 2.41 | 1.48749 | 70.23 |
| 19 | −29.064 | 0.15 | | |
| 20 | 22.121 | 2.08 | 1.60311 | 60.64 |

-continued

| Unit mm | | | | |
|---|---|---|---|---|
| 21 | 57.375 | Variable | | |
| 22 | −112.103 | 0.70 | 1.63400 | 22.88 |
| 23 | −40.750 | 1.00 | 1.51823 | 58.90 |
| 24 | 25.508 | Variable | | |
| 25 | ∞ | 4.70 | 1.51633 | 64.14 |
| 26 | ∞ | 1.60 | | |
| Image plane(Light receiving surface) | ∞ | | | |

| Various data | | | |
|---|---|---|---|
| | Wide angle | Intermediate | Telephoto |
| Focal length | 40.84 | 77.46 | 146.87 |
| Fno. | 4.08 | 4.39 | 5.71 |
| Angle of field 2ω | 30.87 | 16.00 | 8.49 |
| At the time of infinite object point focusing | | | |
| d0 | ∞ | ∞ | ∞ |
| d3 | 0.90 | 35.42 | 55.07 |
| d9 | 19.00 | 6.33 | 3.40 |
| d21 | 14.26 | 13.71 | 2.21 |
| d24 | 16.88 | 19.63 | 47.14 |
| At the time of focusing at an object point which is 900 mm from the image plane | | | |
| d0 | 791.06 | 766.69 | 734.50 |
| d3 | 0.90 | 35.42 | 55.07 |
| d9 | 19.00 | 6.33 | 3.40 |
| d21 | 15.91 | 19.00 | 9.11 |
| d24 | 15.23 | 14.34 | 40.24 |

Table of refractive index
List of refractive index per wavelength of medium of glass material used in the present embodiment

| Glass material | 587.56 | 656.27 | 486.13 | 435.84 |
|---|---|---|---|---|
| L2 | 1.846660 | 1.836488 | 1.872096 | 1.894186 |
| L4 | 1.805181 | 1.796106 | 1.827775 | 1.847283 |
| L8 | 1.910823 | 1.903235 | 1.929074 | 1.944115 |
| L11 | 1.603112 | 1.600079 | 1.610024 | 1.615408 |
| L12 | 1.633997 | 1.626282 | 1.653988 | 1.673212 |
| L1, L10 | 1.487490 | 1.485344 | 1.492285 | 1.495963 |
| L9 | 1.800999 | 1.794275 | 1.817182 | 1.830612 |
| L13 | 1.518229 | 1.515556 | 1.524354 | 1.529154 |
| F | 1.603112 | 1.600079 | 1.610024 | 1.615408 |
| L3 | 1.638539 | 1.635051 | 1.646582 | 1.652906 |
| L5 | 1.658441 | 1.654553 | 1.667495 | 1.674690 |
| L7 | 1.496999 | 1.495136 | 1.501231 | 1.504506 |

EXAMPLE 6

Unit mm

Surface data

| Surface no. | r | d | nd | νd |
|---|---|---|---|---|
| Object plane | ∞ | ∞ | | |
| 1 | 82.056 | 5.10 | 1.48749 | 70.23 |
| 2 | −87.248 | 2.10 | 1.80518 | 25.42 |
| 3 | −165.805 | Variable | | |
| 4 | 74.072 | 1.85 | 1.72916 | 54.68 |
| 5 | 16.441 | 1.23 | | |
| 6 | 17.163 | 2.89 | 1.84666 | 23.78 |
| 7 | 28.867 | 2.14 | | |
| 8 | −32.491 | 1.00 | 1.71300 | 53.87 |
| 9 | −346.978 | Variable | | |
| 10(stop) | ∞ | 1.50 | | |
| 11 | 35.659 | 2.63 | 1.51633 | 64.14 |

-continued

| Unit mm | | | | |
|---|---|---|---|---|
| 12 | −73.225 | 0.14 | | |
| 13 | 19.262 | 3.98 | 1.48749 | 70.23 |
| 14 | −49.611 | 1.00 | 1.90366 | 31.32 |
| 15 | 349.277 | 7.39 | | |
| 16 | −117.449 | 1.80 | 1.83400 | 37.16 |
| 17 | 20.564 | 2.08 | | |
| 18 | 108.019 | 2.45 | 1.51633 | 64.14 |
| 19 | −30.167 | 0.15 | | |
| 20 | 23.731 | 2.70 | 1.60311 | 60.64 |
| 21 | −212.968 | Variable | | |
| 22 | −39.959 | 1.11 | 1.63387 | 23.38 |
| 23 | −23.383 | 4.19 | | |
| 24 | −20.354 | 1.00 | 1.57099 | 50.80 |
| 25 | 164.625 | Variable | | |
| 26 | ∞ | 4.70 | 1.51633 | 64.14 |
| 27 | ∞ | 1.60 | | |
| Image plane(Light receiving surface) | ∞ | | | |

Various data

| | Wide angle | Intermediate | Telephoto |
|---|---|---|---|
| Focal length | 40.79 | 77.52 | 146.73 |
| Fno. | 4.08 | 4.39 | 5.71 |
| Angle of field 2ω | 31.39 | 16.22 | 8.58 |
| At the time of infinite object point focusing | | | |
| D0 | ∞ | ∞ | ∞ |
| D3 | 3.01 | 33.20 | 59.24 |
| D9 | 17.62 | 5.12 | 1.00 |
| D21 | 9.07 | 12.21 | 0.90 |
| D25 | 17.35 | 20.99 | 45.69 |
| At the time of focusing at an object point which is 900 mm from the image plane | | | |
| D0 | 797.90 | 773.28 | 737.99 |
| D3 | 3.01 | 33.20 | 59.24 |
| D9 | 17.62 | 5.12 | 1.00 |
| D21 | 11.32 | 19.35 | 11.29 |
| D25 | 15.11 | 13.85 | 35.31 |

Table of refractive index
List of refractive index per wavelength of medium of glass material used in the present embodiment

| Glass material | 587.56 | 656.27 | 486.13 | 435.84 |
|---|---|---|---|---|
| L3 | 1.729157 | 1.725101 | 1.738436 | 1.745696 |
| L5 | 1.712995 | 1.708974 | 1.722210 | 1.729434 |
| L4 | 1.846660 | 1.836488 | 1.872096 | 1.894186 |
| L2 | 1.805181 | 1.796106 | 1.827775 | 1.847283 |
| L8 | 1.903660 | 1.895260 | 1.924120 | 1.941280 |
| L6, L10 | 1.516330 | 1.513855 | 1.521905 | 1.526213 |
| L12 | 1.633870 | 1.626381 | 1.653490 | 1.671610 |
| L13 | 1.570989 | 1.567616 | 1.578856 | 1.585136 |
| F | 1.516330 | 1.513855 | 1.521905 | 1.526213 |
| L11 | 1.603112 | 1.600079 | 1.610024 | 1.615408 |
| L1, L7 | 1.487490 | 1.485344 | 1.492285 | 1.495963 |
| L9 | 1.834000 | 1.827376 | 1.849819 | 1.862779 |

Next, values of conditional expressions (2) to (4) in each embodiments described above are described.

| Conditional expression | Example 1 | Example 2 | Example 3 |
|---|---|---|---|
| (1)$N_{d4}$ | 1.63387 | 1.63387 | 1.63400 |
| (1)$\nu_{d4}$ | 23.38 | 23.38 | 22.88 |
| (2) | −1.910 | −1.808 | −1.907 |
| (3) | 0.668 | 0.668 | 0.694 |
| (4) | −2.296 | −3.732 | −4.381 |
| (5) | — | 0.391 | 0.632 |
| (6) | 0.431 | 0.345 | 0.343 |

-continued

| Conditional expression | Example 4 | Example 5 | Example 6 |
|---|---|---|---|
| (1)$N_{d4}$ | 1.64800 | 1.63400 | 1.63387 |
| (1)$\nu_{d4}$ | 22.00 | 22.88 | 23.38 |
| (2) | −2.201 | −1.932 | −2.381 |
| (3) | 0.731 | 0.694 | 0.668 |
| (4) | −6.382 | −2.142 | −3.821 |
| (5) | 0.988 | — | 0.779 |
| (6) | 0.335 | 0.370 | 0.304 |

Thus, it is possible to use such image forming optical system of the present invention in a photographic apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 19:
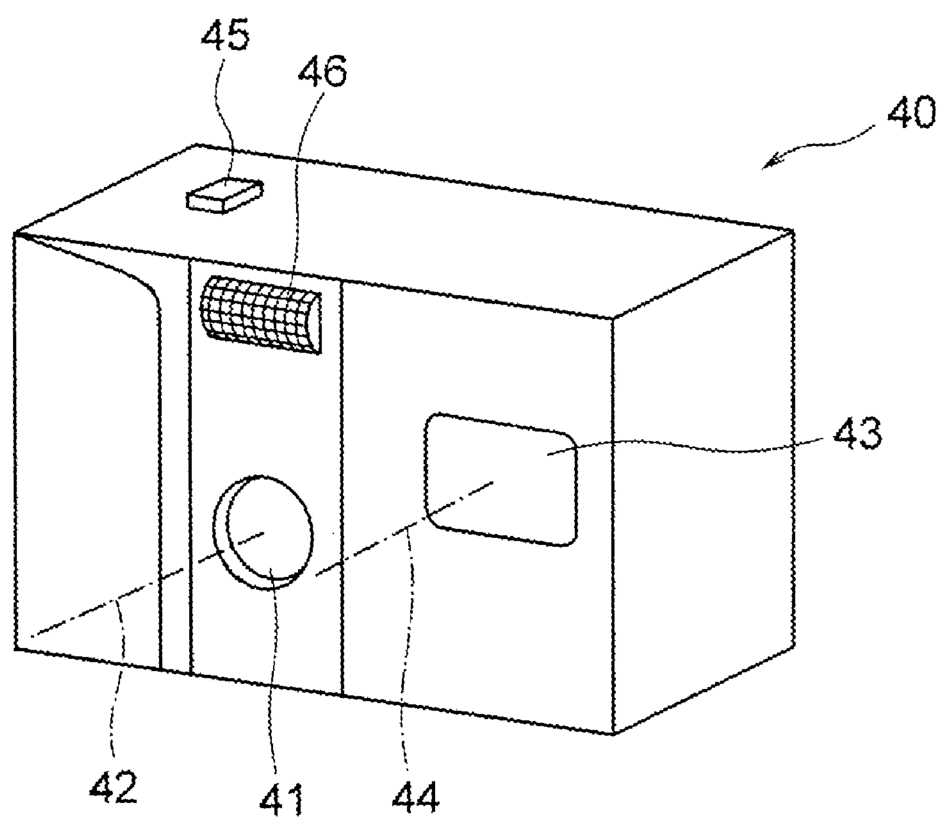
FIG. 19 is a front perspective view showing an appearance of a digital camera 40 in which, the image forming optical system according to the present invention is incorporated.
Figure 20:
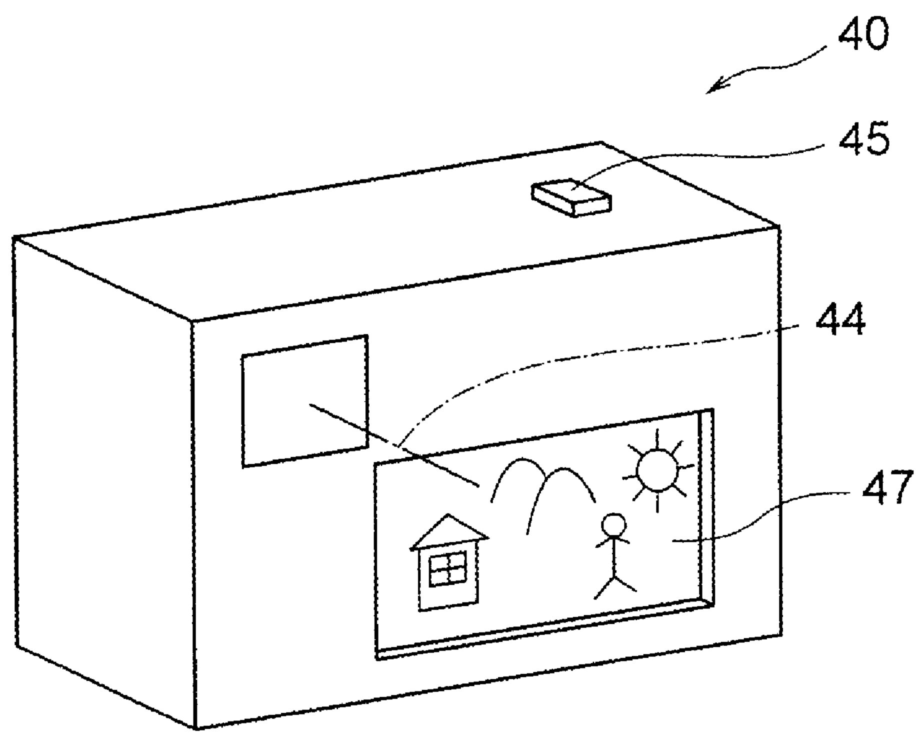
FIG. 20 is a rear perspective view of the digital camera 40.
Figure 21:
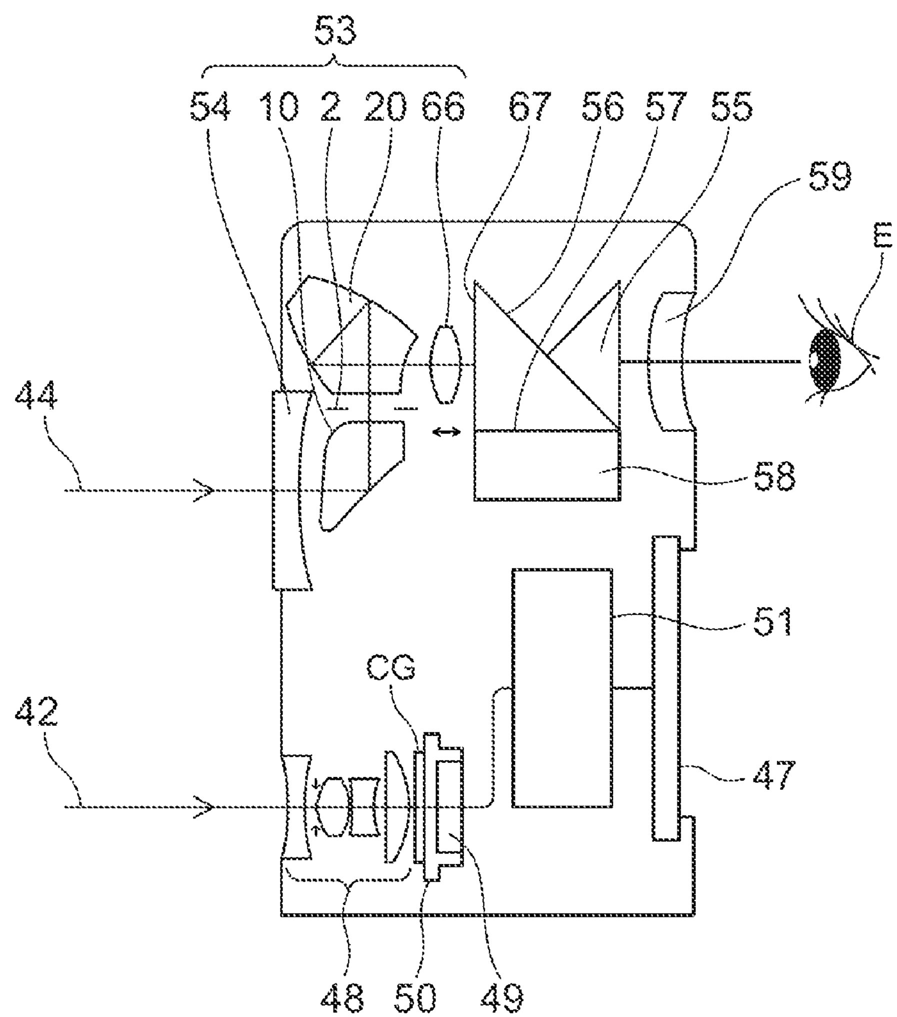
FIG. 21 is a cross-sectional view showing an optical arrangement of the digital camera 40.

In FIG. 19 to FIG. 21 show conceptual diagrams of structures in which the image forming optical system according to the present invention is incorporated in a photographic optical system 41 of a digital camera. FIG. 19 is a frontward perspective view showing an appearance of a digital camera 40, FIG. 20 is a rearward perspective view of the same, and FIG. 21 is a cross-sectional view showing an optical arrangement of the digital camera 40.

The digital camera 40, in a case of this example, includes the photographic optical system 41 (an objective optical system for photography 48) having an optical path for photography 42, a finder optical system 43 having an optical path for finder 44, a shutter 45, a flash 46, and a liquid-crystal display monitor 47. Moreover, when the shutter 45 disposed at an upper portion of the camera 40 is pressed, in conjugation with this, a photograph is taken through the photographic optical system 41 (objective optical system for photography 48) such as the zoom lens in the first embodiment.

An object image formed by the photographic optical system 41 is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording (recorded writing) electronically by a floppy disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

By the digital camera 40 structured in such manner, it is possible to realize an optical image pickup apparatus having a zoom lens with a reduced size and thickness, in which the number of structural components is reduced. Incidentally, the present invention could be applied to a bending type digital camera having a bending optical system, in addition to the above-mentioned collapsible type digital camera.

Figure 22:
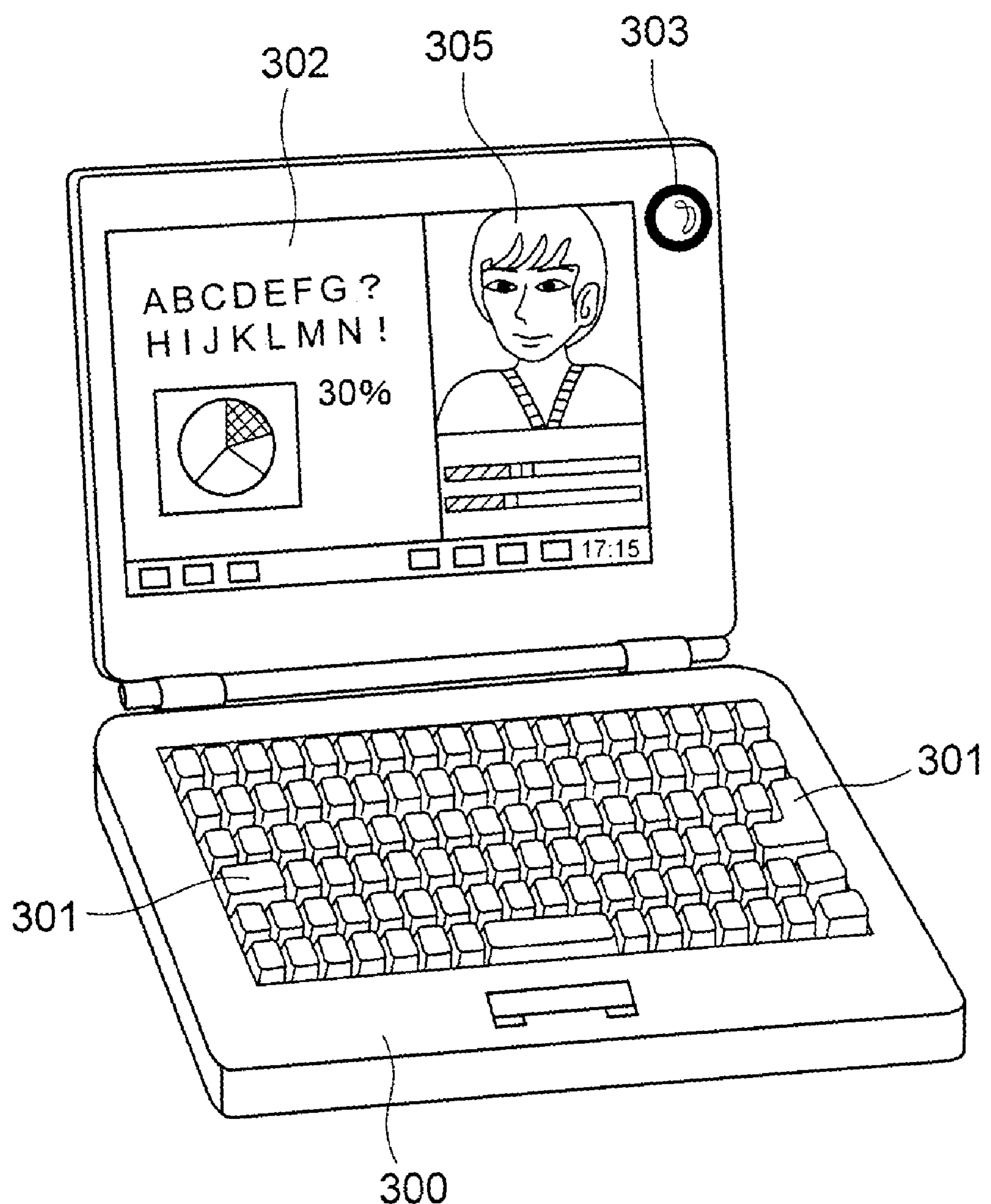
FIG. 22 is a front perspective view of a state in which, a cover of a personal computer 300 which is an example of an information processing apparatus in which, the image forming optical system of the present invention is built-in as an objective optical system, is opened.
Figure 23:
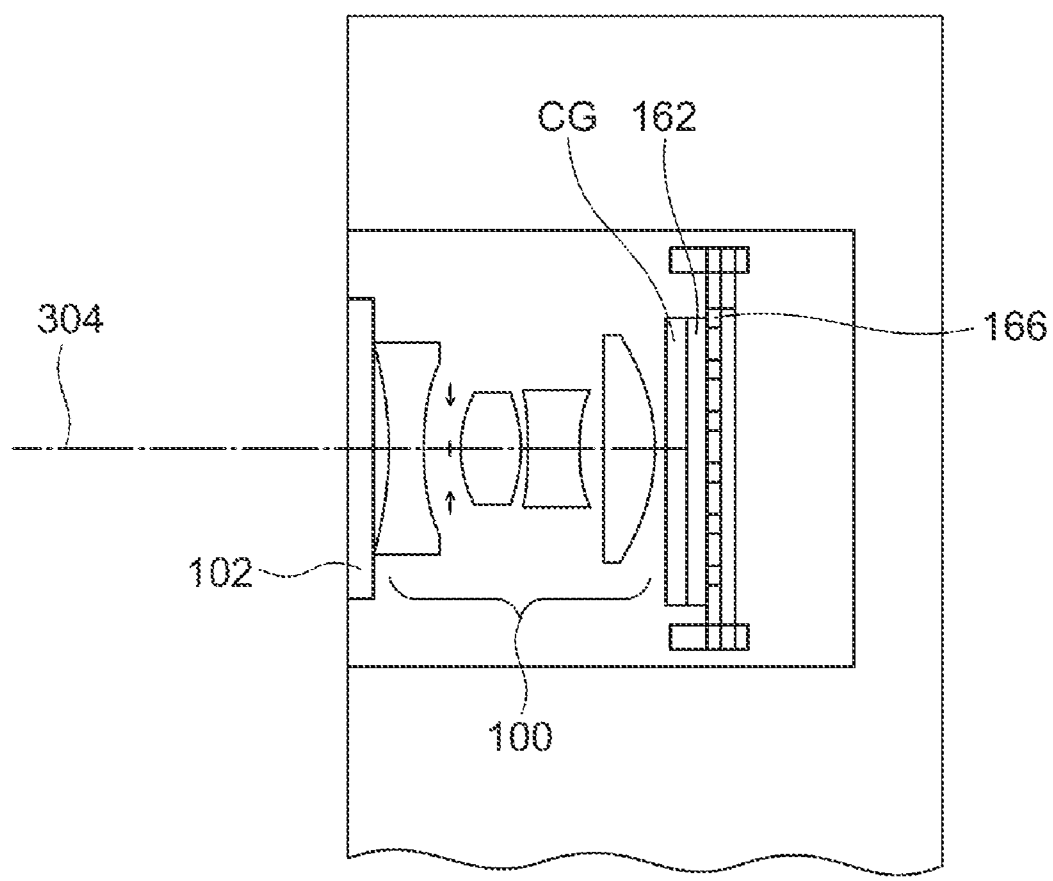
FIG. 23 is a cross-sectional view of a photographic optical system 303 of the personal computer 300.
Figure 24:
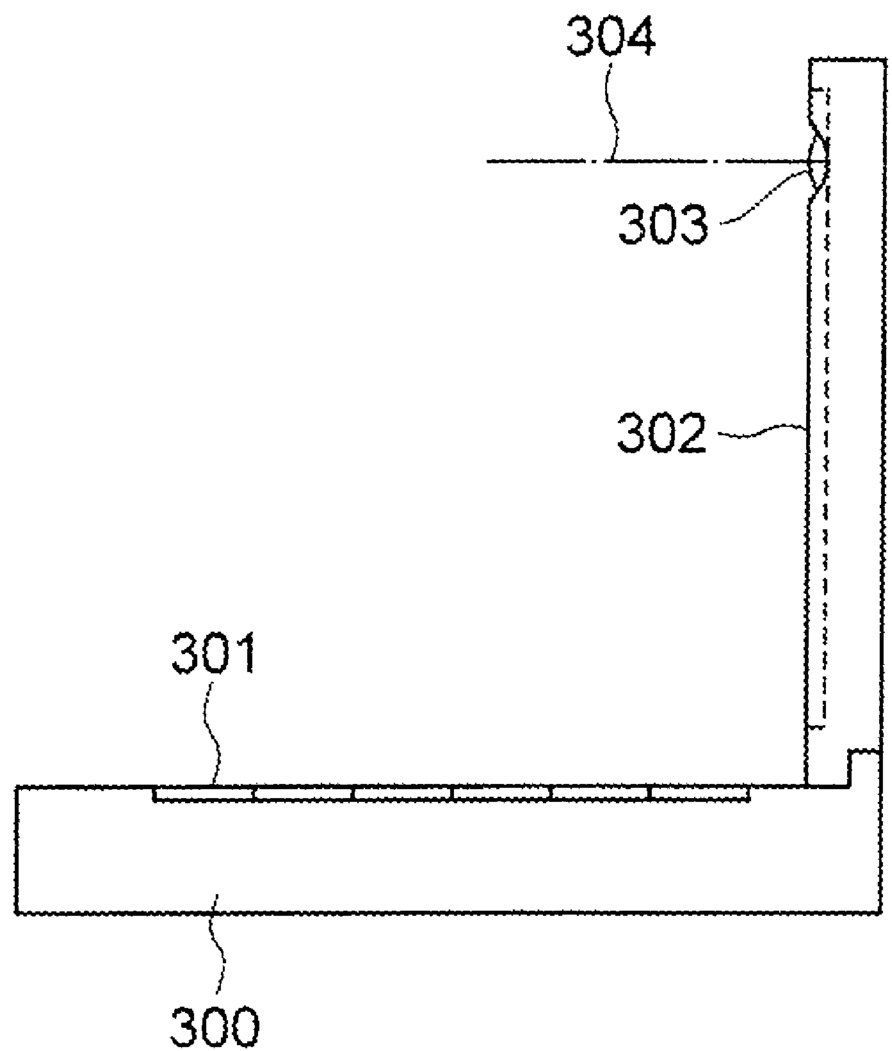
FIG. 24 is a side view of the personal computer 300.

Next, a personal computer which is an example of an information processing apparatus with a built-in image forming system as an objective optical system is shown in FIG. 22 to FIG. 24. FIG. 22 is a frontward perspective view of a personal computer 300 with its cover opened, FIG. 23 is across-sectional view of a photographic optical system 303 of the personal computer 300, and FIG. 24 is a side view of FIG. 22. As it is shown in FIG. 22 to FIG. 24, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

At a front end of a mirror frame, a cover glass 102 for protecting the objective optical system 100 is disposed.

An object image received at the electronic image pickup element chip 162 is input to a processing means of the personal computer 300 via a terminal 166. Further, the object image is displayed as an electronic image on the monitor 302. In FIG. 40, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

Figure 25A:
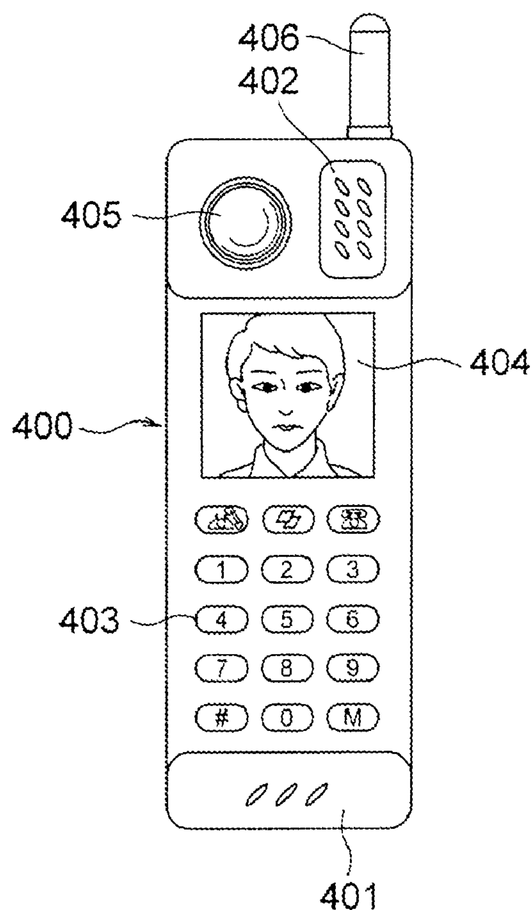
FIG. 25A, FIG. 25B, and FIG. 25C are diagrams showing a mobile telephone which is an example of the information processing apparatus in which, the image forming optical system of the present invention is built-in as a photographic optical system, where.
Figure 25B:
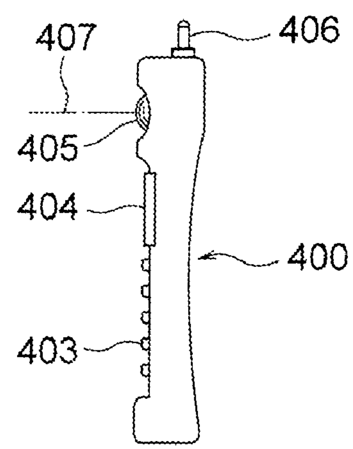
Figure 25C:
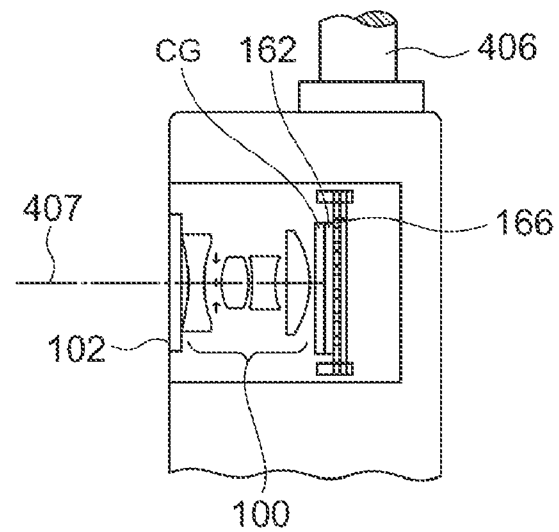

Next, a telephone which is an example of an information processing apparatus in which the image forming optical system of the present invention is built-in as a photographic optical system, particularly a portable telephone which is easy to carry is shown in FIG. 25A, FIG. 25B, and FIG. 25C. FIG. 25A is a front view of a portable telephone 400, FIG. 25B is a side view of the portable telephone 400, and FIG. 25C is a cross-sectional view of a photographic optical system 405. As shown in FIG. 25A to FIG. 25C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

The present invention can have various modified embodiments which fairly fall within the basic teaching herein set forth.

According to the present invention, is it possible to provide an image pickup apparatus which includes a compact image forming optical system in which, it is possible to make a focusing lens group drive light-weight, and to enable rear focus, as well as to maintain favorable optical performance from infinity to a close point.

What is claimed is:

1. An image pickup apparatus including a variable power imaging optical system comprising in order from an object side:

a first lens group having a positive refractive power;

a second lens group having a negative refractive power;

a third lens group having a positive refractive power; and a fourth lens group having a negative refractive power, wherein the fourth lens group comprises two lens components namely, a positive meniscus lens having a convex surface directed toward an image side, and a biconcave negative lens in order from the object side, or, one lens component in which, the positive meniscus lens having the convex surface directed toward the image side, and the biconcave negative lens are cemented in order from the object side, and the fourth lens group satisfies the following conditional expressions (1) and (2)

$$N_{d4} \leqq -0.015 \times \nu_{d4} + 2.04 \quad (1)$$

$$-2.5 \leqq f_{G4}/L \leqq -1.5 \quad (2)$$

where, $N_{d4}$ denotes a refractive index of a glass material of the positive meniscus lens in the fourth lens group of the image forming optical system, $\nu_{d4}$ denotes Abbe's number $(n_{d1}-1)/(n_{F1}-n_{C1})$ for a d-line of the glass material of the positive meniscus lens in the fourth lens group of the image forming optical system, $f_{G4}$ denotes a focal length of the fourth lens group in the image forming optical system, L denotes a length of a diagonal of an image pickup element, and $n_{d1}$, $n_{C1}$, and $n_{F1}$ denote refractive indices of the positive meniscus lens for the d-line, a C-line, and an F-line respectively.

2. The image pickup apparatus according to claim 1, wherein the image forming optical system satisfies the following conditional expression (3)

$$0.66 \leqq \theta_{gF4p} \leqq 0.75 \quad (3)$$

where, $\theta_{gF4p}$ denotes a partial dispersion ratio $(n_g-n_F)/(n_F-n_C)$ of the positive meniscus lens in the fourth lens group of the image forming optical system, where, $n_g$ denotes a refractive index for a g-line, of the positive meniscus lens, $n_F$ denotes a refractive index for the F-line, of the positive meniscus lens, and $n_C$ denotes a refractive index for the C-line, of the positive meniscus lens.

3. The image pickup apparatus according to claim 1, wherein the image forming optical system satisfies the following conditional expression (4)

$$-7.0 \leqq (R_{b+}+R_{a+})/(R_{b+}-R_{a+}) \leqq 2.0 \quad (4)$$

where, $R_{a+}$ denotes a radius of curvature on the object side, of the positive meniscus lens in the fourth lens group of the image forming optical system, and $R_{b+}$ denotes a radius of curvature on the image side, of the positive meniscus lens in the fourth lens group of the image forming optical system.

4. The image pickup apparatus according to claim 1, wherein the third lens group of the image forming optical system, in order from the object side, comprises an aperture stop, a front group of a lens component having a positive refractive power, and a rear group of a lens component having a positive refractive power, and comprises a lens component having a negative refractive power nearest to the image side of the front group.

5. The image pickup apparatus according to claim 1, wherein the third lens group of the image forming optical system, in order from the object side, comprises an aperture stop, a front group of a positive lens component having a positive refractive power, and a rear group of a lens component having a positive refractive power, and comprises a lens having a negative refractive power nearest to the object side of the rear lens group.

6. The image pickup apparatus according to claim 1, wherein the second lens group of the image forming optical system, in order from the object side, comprises a lens component having a negative refractive power, a lens component having a positive refractive power, and a lens component having a negative refractive power.

7. The image pickup apparatus according to claim 1, wherein the first lens group of the image forming optical system, in order from the object side, comprises two lens components namely, a lens component having a positive refractive power and a lens component having a negative refractive power or one lens component in which, the lens component having a positive refractive power and the lens component having a negative refractive power are cemented.

* * * * *